United States Patent
Gupta et al.

(10) Patent No.: US 9,642,033 B2
(45) Date of Patent: *May 2, 2017

(54) PROVIDING MULTIPLE LEVELS OF SERVICE FOR WIRELESS COMMUNICATION

(75) Inventors: Rajarshi Gupta, Santa Clara, CA (US); Fatih Ulupinar, San Diego, CA (US); Parag A. Agashe, San Diego, CA (US); Peerapol Tinnakornsrisuphap, San Diego, CA (US); Rajat Prakash, La Jolla, CA (US); Gavin Bernard Horn, La Jolla, CA (US); Gerardo Giaretta, San Diego, CA (US); Kalle Ahmavaara, San Diego, CA (US); Osok Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

This patent is subject to a terminal disclaimer.

(21) Appl. No.: 13/456,082

(22) Filed: Apr. 25, 2012

(65) Prior Publication Data
US 2013/0107702 A1    May 2, 2013

Related U.S. Application Data

(63) Continuation of application No. 12/401,459, filed on Mar. 10, 2009, now Pat. No. 8,179,903.
(Continued)

(51) Int. Cl.
*H04L 12/28* (2006.01)
*H04W 28/02* (2009.01)
(Continued)

(52) U.S. Cl.
CPC ....... *H04W 28/0268* (2013.01); *H04L 12/287* (2013.01); *H04L 12/2876* (2013.01);
(Continued)

(58) Field of Classification Search
USPC ....... 370/230, 231, 235, 236, 312, 315, 329, 370/389, 390, 400, 401, 410, 432, 434,
(Continued)

(56) References Cited

U.S. PATENT DOCUMENTS 6,701,361 B1 * 3/2004 Meier ........................ 709/224
7,146,425 B2 * 12/2006 Oottamakorn et al. ...... 709/235
(Continued)

FOREIGN PATENT DOCUMENTS

| CN | 1863144 A | 11/2006 |
|---|---|---|
| CN | 1954580 A | 4/2007 |

(Continued)

OTHER PUBLICATIONS

Taiwan Search Report—TW098107932—TIPO—Jul. 3, 2012.
(Continued)

*Primary Examiner* — Ricky Ngo
*Assistant Examiner* — Wei-Po Kao
(74) *Attorney, Agent, or Firm* — François A. Pelaez

(57) ABSTRACT

Local breakout is provided by one or more nodes (e.g., a local access point and/or a local gateway) in a wireless network to facilitate access to one or more local services. In conjunction with local breakout, multiple IP points of presence relating to different levels of service may be provided for an access point. For example, one point of presence may relate to a local service while another point of presence may relate to a core network service.

50 Claims, 22 Drawing Sheets

Related U.S. Application Data

(60) Provisional application No. 61/036,037, filed on Mar. 12, 2008, provisional application No. 61/091,675, filed on Aug. 25, 2008, provisional application No. 61/115,430, filed on Nov. 17, 2008.

(51) Int. Cl.
*H04W 8/08* (2009.01)
*H04W 48/16* (2009.01)
*H04L 29/08* (2006.01)
*H04W 48/00* (2009.01)
*H04W 64/00* (2009.01)
*H04W 80/04* (2009.01)
*H04W 84/04* (2009.01)

(52) U.S. Cl.
CPC ............ *H04L 67/04* (2013.01); *H04L 67/327* (2013.01); *H04W 8/082* (2013.01); *H04W 48/16* (2013.01); *H04W 48/17* (2013.01); *H04W 64/00* (2013.01); *H04W 80/04* (2013.01); *H04W 84/045* (2013.01)

(58) Field of Classification Search
USPC ........................................ 370/471, 492, 501
See application file for complete search history.

(56) References Cited

U.S. PATENT DOCUMENTS

| | | | |
|---|---|---|---|
| 7,251,227 | B2 | 7/2007 | De Jong et al. |
| 8,179,903 | B2 | 5/2012 | Gupta et al. |
| 2003/0076854 | A1* | 4/2003 | Mudhar et al. ............... 370/432 |
| 2003/0142643 | A1* | 7/2003 | Yang et al. ................... 370/328 |
| 2003/0206518 | A1* | 11/2003 | Yik et al. ...................... 370/230 |
| 2004/0028009 | A1* | 2/2004 | Dorenbosch et al. ........ 370/329 |
| 2004/0258008 | A1* | 12/2004 | Inoue et al. .................. 370/312 |
| 2004/0266435 | A1* | 12/2004 | de Jong et al. .............. 455/436 |
| 2005/0117546 | A1 | 6/2005 | Lioy et al. |
| 2005/0276218 | A1 | 12/2005 | Ooghe et al. |
| 2007/0173283 | A1 | 7/2007 | Livet et al. |
| 2008/0003988 | A1 | 1/2008 | Richardson |
| 2008/0285492 | A1* | 11/2008 | Vesterinen ............ H04W 4/001 370/310 |
| 2008/0304416 | A1 | 12/2008 | Fodor et al. |
| 2008/0317045 | A1* | 12/2008 | Chen .............................. 370/400 |
| 2010/0182912 | A1* | 7/2010 | Hongisto et al. ............. 370/242 |

FOREIGN PATENT DOCUMENTS

| | | |
|---|---|---|
| JP | 2007538470 A | 12/2007 |
| JP | 2010053752 A | 3/2010 |
| JP | 2010537526 A | 12/2010 |
| RU | 2304856 C2 | 8/2007 |
| SE | WO2007/073271 A1 * | 6/2007 |
| WO | 2004034720 A2 | 4/2004 |
| WO | WO2005117392 | 12/2005 |
| WO | WO2007025457 A1 | 3/2007 |
| WO | WO2007073271 A1 | 6/2007 |
| WO | WO2007073773 | 7/2007 |
| WO | 2008021182 A2 | 2/2008 |
| WO | 2009024182 A1 | 2/2009 |

OTHER PUBLICATIONS

Hongisto et al, US Provisional Application, Sep. 27, 2006, U.S. Appl. No. 60/847,367.

International Search Report & Written Opinion—PCT/US09/036858 International Search Authority—European Patent Office—Oct. 9, 2009.

Qualcomm: "S2-061474: Use Cases for Multiple Registrations" Internet Citation, [Online] XP002450226 Retrieved from the Internet: URL:http://www.3gpp.org> [retrieved on Sep. 11, 2007] the whole document.

Roger Kalden et al: "Wireless Internet Access Based on GPRS" IEEE Personal Communications, vol. 7, No. 2, Apr. 2000 (Apr. 2000), pp. 8-18, XP011092385 ISSN: 1070-9916 p. 10, left-hand column, line 16—right-hand column, line 33; figure 2.

Wei Qu et al: "IPsec-based secure wireless virtual private network" Proceedings of the IEEE Military Communications Conference (MILCOM), vol. 2, Oct. 7, 2002 (Oct. 7, 2002), pp. 1107-1112, XP010631933 ISBN: 978-0-7803-7625-0 figure 2.

Zhao X, Castelluccia C, and Baker M: "Flexible Network Support for Mobile Hosts" Mobile Networks and Applications, ACM, New York, NY, US, vol. 6, No. 2, Mar. 1, 2001 (Mar. 1, 2001), pp. 137-149, XP001185779 ISSN: 1383-469X section 4.2; table 1.

\* cited by examiner

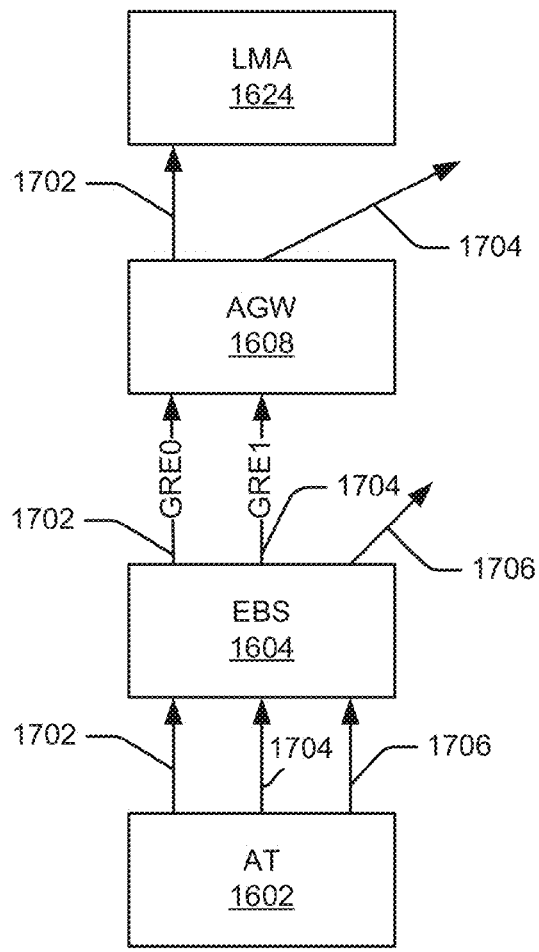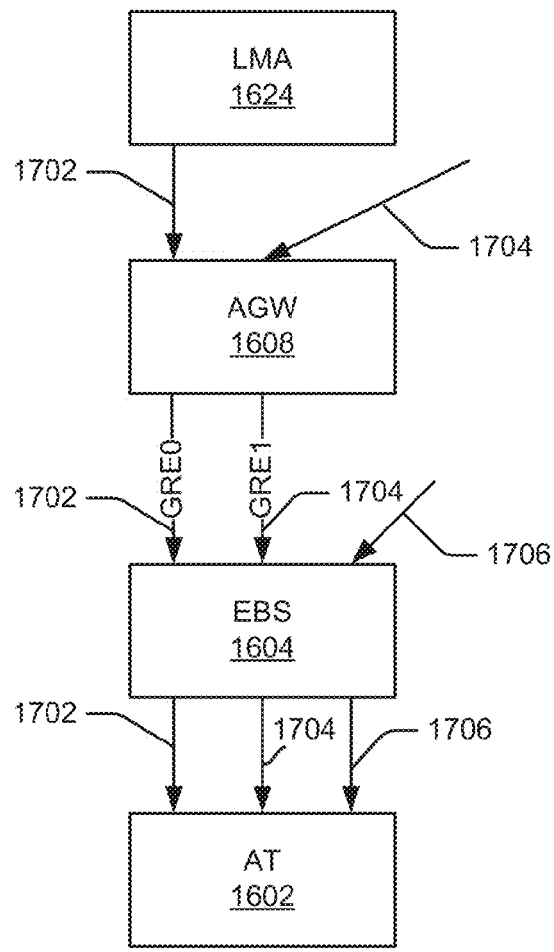
FIG. 17A
FIG. 17B

PROVIDING MULTIPLE LEVELS OF
SERVICE FOR WIRELESS
COMMUNICATION

CROSS REFERENCE TO RELATED
APPLICATIONS AND CLAIM OF PRIORITY

This application is a continuation of U.S. patent application Ser. No. 12/401,459, "PROVIDING MULTIPLE LEVELS OF SERVICE FOR WIRELESS COMMUNICATION DEVICES COMMUNICATING WITH A SMALL COVERAGE ACCESS POINT," filed Mar. 10, 2009 and now issued as U.S. Pat. No. 8,179,903, which claims the benefit of and priority to commonly owned U.S. Provisional Patent Application No. 61/036,037, filed Mar. 12, 2008, U.S. Provisional Patent Application No. 61/091,675, filed Aug. 25, 2008, and U.S. Provisional Patent Application No. 61/115,430, filed Nov. 17, 2008, the disclosure of each of which is hereby incorporated by reference herein.

BACKGROUND

Field

This application relates generally to wireless communication and more specifically, but not exclusively, to improving communication performance.

Introduction

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

To supplement conventional mobile phone network access points, small-coverage access points may be deployed (e.g., installed in a user's home) to provide more robust indoor wireless coverage to mobile units. Such small-coverage access points are generally known as access point base stations, Home NodeBs, or femto cells. Typically, such small-coverage access points are connected to the Internet and the mobile operator's network via a DSL router or a cable modem.

In some wireless architectures, the access point is a layer 2 device that does not process Internet Protocol ("IP") packets routed to or from an access terminal. For example, on a reverse link, the access point may receive packets from the access terminal and forward the packets into the network via a protocol tunnel. Conversely, on a forward link, the access point may receive packets from the network via a protocol tunnel and transmit the packets to the access terminal associated with that protocol tunnel. Consequently, the endpoint for a protocol tunnel may be the first hop router (or a node beyond the first hop router). As such, any packet from the access terminal will traverse this route before it is forwarded to its destination. Similarly, any packet destined for the access terminal will be routed via the endpoint device of this tunnel. When the first hop router is located relatively far away from access terminal, however, suboptimal routing may occur. Moreover, an access terminal may not be able to access local services since the services may not be visible to the first hop router (e.g., due to a firewall at a router associated with the local services). Thus, there is a need for improved routing techniques for wireless networks.

SUMMARY

A summary of sample aspects of the disclosure follows. It should be understood that any reference to the term aspects herein may refer to one or more aspects of the disclosure.

The disclosure relates in some aspect to providing local breakout to facilitate access to one or more local services. For example, local breakout may be provided by a local access point and/or a local gateway to enable an access terminal to access one or more services that may be accessed via the local access point and/or the local gateway.

The disclosure relates in some aspect to providing multiple IP points of presence (e.g., points of attachment) for an access terminal. Here, each point of presence may correspond to a different service (e.g., a different level of service). For example, one point of presence may relate to a local service while another point of presence may relate to a core network service. Thus, in some aspects, a level of service may relate to the termination of a packet in a network. In some aspects the access terminal uses the multiple IP points of presence to access services via an associated access point, where the access terminal and the access point communicate over a single air interface.

The disclosure relates in some aspect to sending a packet in a manner that indicates the level of service associated with the packet. In this way, a node sending a packet over-the-air may indicate a termination point for the packet. In some aspects, the level of service may indicate whether the packet is to be sent via a protocol tunnel and/or indicate an endpoint of a protocol tunnel that is used to route the packet. As an example, an access terminal may identify a level of service for a packet by specifying a particular stream upon which the packet is to be sent or by sending an appropriate identifier with the packet (e.g., in a header). An access point that receives this packet over-the-air from the access terminal may then determine how to send the packet (e.g., determine whether to send the packet via a tunnel and/or determine the endpoint) based on the identified level of service.

The disclosure relates in some aspect to providing different mobility management functionality and/or session management functionality at different nodes in a system whereby mobility and/or session management for a given node may be provided by a different node for different traffic. For example, a network node may provide mobility and/or session management associated with core network traffic while a local node may provide mobility and/or session management associated with local traffic at the local node.

The disclosure relates in some aspect to an access terminal that supports multiple non access stratum ("NAS") instances for setting up access to different services (e.g., local IP access versus network IP access). For example, one or more NAS instances may be defined for communicating with a local mobility manager (e.g., that handles local mobility and session management) to facilitate access to local services while one or more other NAS instances may be defined for communicating with a network mobility manager (e.g., that handles core network mobility and session management) to facilitate access to core network services.

The disclosure relates in some aspect to providing different types of paging for different types of traffic. For example, paging for local traffic may be managed by a local mobility manager while paging for network traffic may be managed by a network mobility manager.

The disclosure relates in some aspect to carrying messages typically associated with one protocol (e.g., S11) over another protocol (e.g., S1). For example, S11 protocol messages elating to creating bearers that are sent between a serving gateway and a mobility manager may be carried by S1 protocol between the mobility manager and an access point that is co-located with the serving gateway.

BRIEF DESCRIPTION OF THE DRAWINGS

These and other sample aspects of the disclosure will be described in the detailed description and the appended claims that follow, and in the accompanying drawings, wherein:

FIGS. 17A and 17B are simplified block diagrams of several sample aspects of a wireless communication system employing multiple keys to support multiple links for local breakout;

Figure 1:
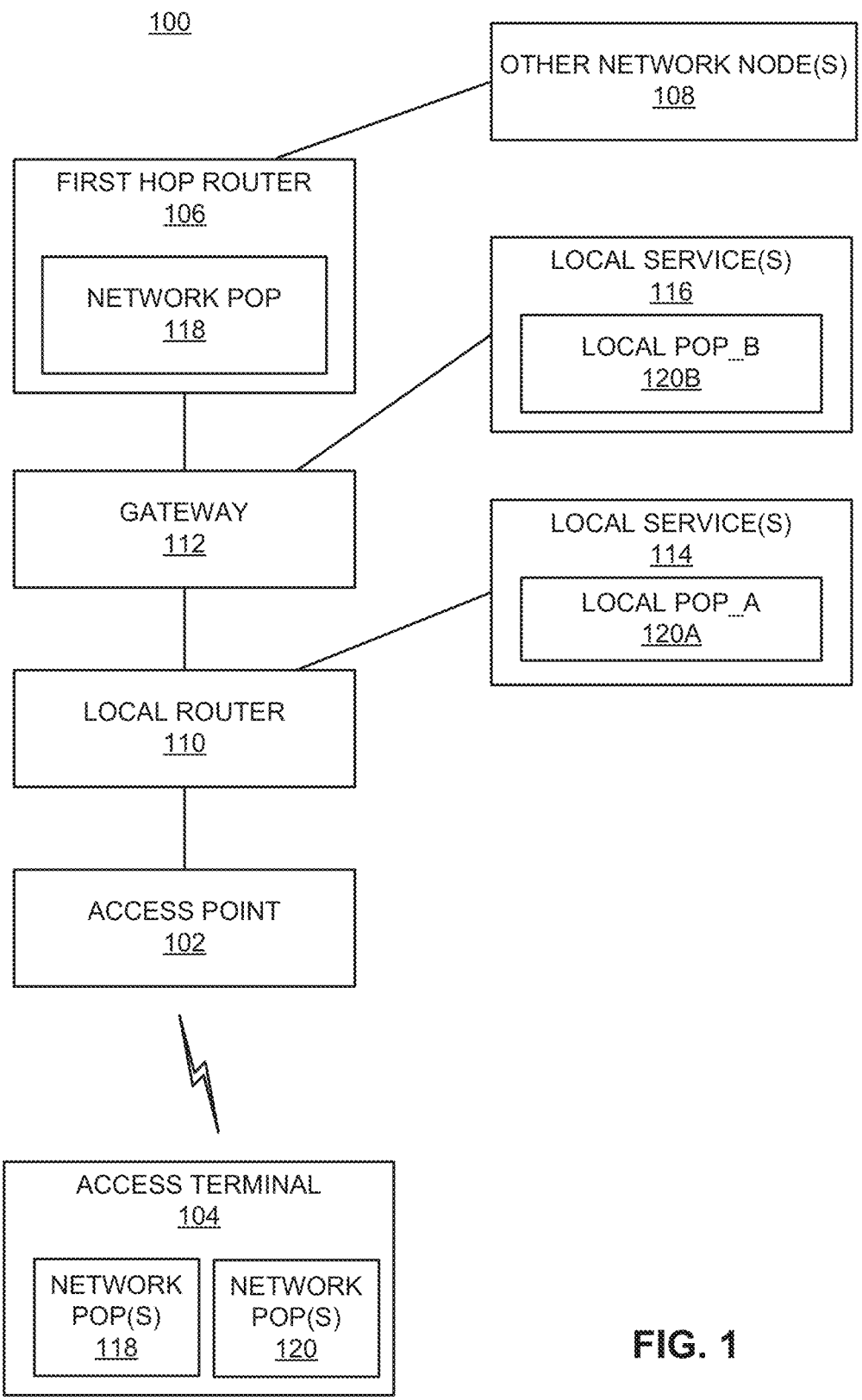
FIG. 1 is a simplified block diagram of several sample aspects of a wireless communication system configured to provide local breakout.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes in a sample communication system 100 (e.g., a portion of a communication network). For illustration purposes, various aspects of the disclosure will be described in the context of one or more access terminals, access points, gateways, and network nodes that communicate with one another. It should be appreciated, however, that the teachings herein may be applicable to other types of apparatuses or other similar apparatuses that are referenced using other terminology. For example, in various implementations access points may be referred to or implemented as base stations, access terminals may be referred to or implemented as user equipment, and so on.

The system 100 includes access points that provide one or more services (e.g., network connectivity) for one or more access terminals that may reside within or that may roam throughout an associated geographical area. To reduce the complexity of FIG. 1, only a single access point 102 and a single access terminal 104 are shown. Each of the access points in the system 100 may communicate with one or more network nodes (e.g., first hop router 106 and other network nodes 108) to facilitate wide area network connectivity. Such network nodes may take various forms such as, for example, one or more radio and/or core network entities (e.g., mobility management entities, session reference network controllers, gateways, routers, or some other suitable network entity or entities), one or more correspondent nodes, and so on.

The system 100 includes various nodes that provide access to different services (e.g., different levels of service). In particular, the system 100 includes one or more nodes (e.g., local router 110 and gateway 112) that provide local breakout to one or more local services (e.g., at a visited network). For example, the local router 110 may enable the access terminal 104 to access to one or more local services 114. Similarly, the gateway 112 (e.g., an edge gateway) may enable the access terminal 104 to access to one or more local services 116.

These local services may take various forms. For example, in some implementations the local service 114 may relate to services provided by a local network (e.g., by various entities on the same IP subnetwork controlled by the local router 110). Such local network services may involve, for example, access to a local printer, a local server, or some other entity. In some implementations the local service 114 may include Internet connectivity. For example, the local router 110 may enable the access terminal 104 to access an Internet connection provided by an Internet service provider ("ISP") at a particular location (e.g., a user's home, an Internet hotspot, etc.). In some implementations the local service 116 may relate to network-related services that are local in nature. For example, the local service 116 may relate to location (e.g., position) information that the access terminal 104 may use to obtain other services.

To facilitate local breakout, multiple IP points of presence ("POP") are provided for the access terminal 104. In conjunction with each point of presence, the access terminal 104 provides a corresponding IP interface (associated with an IP address) associated with a corresponding level of service. Thus, the access terminal 104 may use a first IP address to access a first level of service (e.g., network service) and use a second IP address to access a second level of service (e.g., local service). For example, one or more network points of presence 118 may be defined to enable the access terminal 104 to communicate with the first hop router 106 (e.g., a core network gateway) to obtain service via the core network (e.g., from a home network). In addition, one or more network points of presence 120 may be defined to enable the access terminal 104 to communicate with a local entity to access local services. For example, the access terminal 104 may use point of presence 120A to access local service 114 and the access terminal 104 may use point of presence 120B to access local service 116.

Sample local breakout-related operations will now be discussed in more detail in conjunction with the flowcharts of FIGS. 2-5. For convenience, the operations of FIGS. 2-5 (or any other operations discussed or taught herein) may be described as being performed by specific components (e.g., components of the system 100 and/or a system 600 as depicted in FIG. 6). It should be appreciated, however, that these operations may be performed by other types of components and may be performed using a different number of components. It also should be appreciated that one or more of the operations described herein may not be employed in a given implementation.

Figure 2:
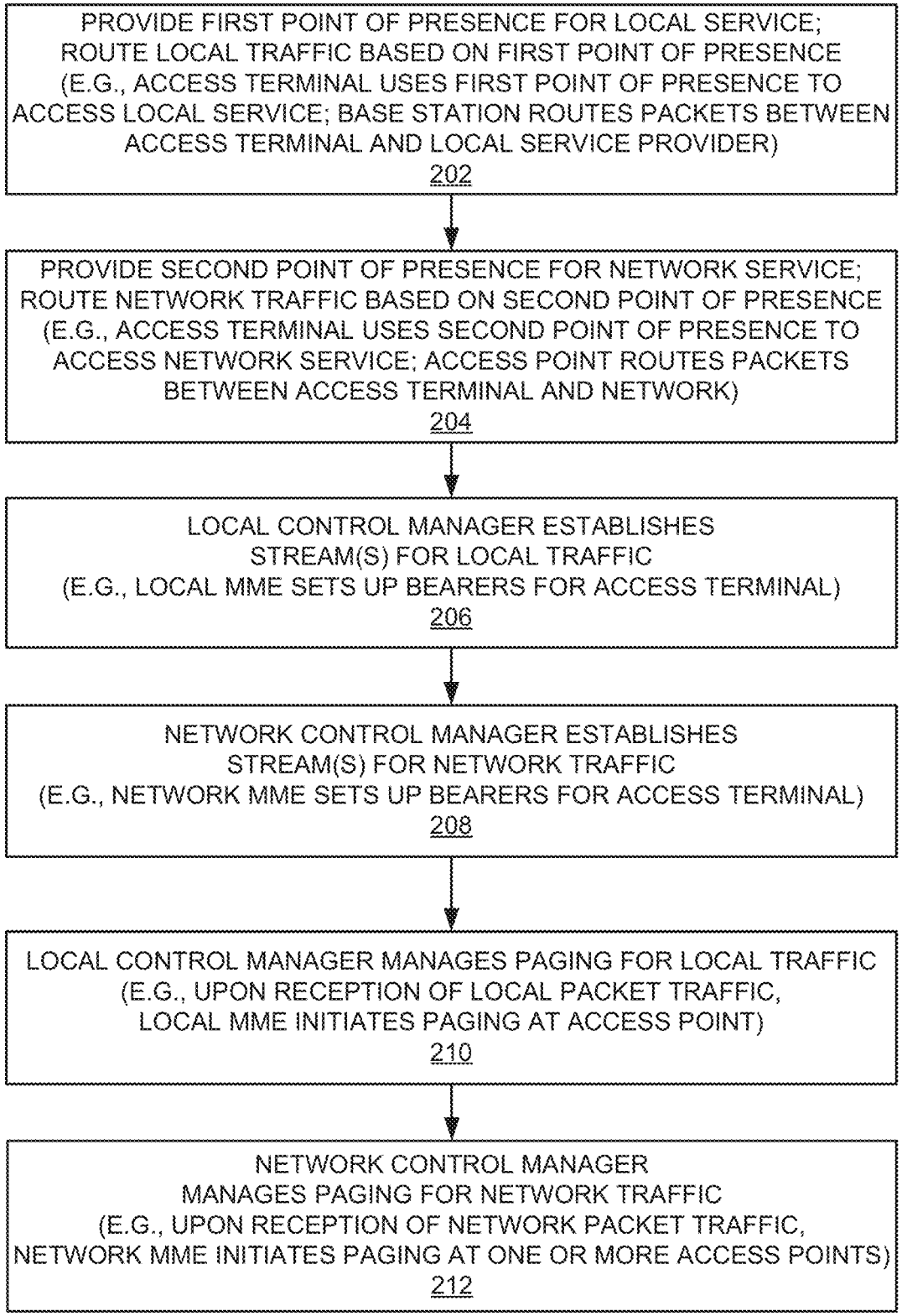
FIG. 2 is a flowchart of several sample aspects of operations that may be performed in conjunction with providing multiple points of presence.

Referring initially to FIG. 2, several operations relating to providing multiple points of presence in conjunction with local breakout will be described. Blocks 202 and 204 relate to providing points of presence for the access terminal 104. A point of presence may relate to different parameters in different implementations. For example, in some implementations (e.g., LTE-based implementations) each point of presence may relate to a different access point name ("APN") associated with a bearer service. Thus, a first level of service (e.g., local service) may be associated with one APN ID while another level of service (e.g., core network service) may be associated with another APN ID. In some implementations (e.g., UMB-based implementations) each point of presence may relate to a different LinkID. Thus, a first level of service may be associated with one LinkID while another level of service may be associated with another LinkID.

As represented by block 202, a first point of presence is provided for local service. Here, the access point 102 (e.g., in cooperation with the local router 110) may assign an IP address to the access terminal 104 to be used in conjunction with routing local traffic to and from the access terminal 104. For example, one IP address may be assigned for accessing the local service 114 via the local router 110. Alternatively or in addition, an IP address may be assigned for accessing the local service 116 via the gateway 112. The access point 102 may thereby use the local IP address to route packets between the access terminal 104 and an entity that provides local service.

As represented by block 204, a second point of presence is provided for network service. In this case, the network (e.g., the first hop router 106) may assign an IP address to the access terminal 104 to be used in conjunction with routing network traffic to and from the access terminal 104. The access point 102 may thereby use this IP address to route packets between the access terminal 104 and an entity that provides network service.

Blocks 206-212 relate to operations that may be employed in an implementation where control management functionality is distributed. In particular, as will be described in more detail in conjunction with FIG. 7, in some implementations control management functionality for a given access terminal may be provided by different entities. For example, mobility management functionality relating to local service may be provided by a local mobility manager (not shown in FIG. 1). Conversely, mobility management functionality relating to network service may be provided by a network mobility management entity (not shown in FIG. 1).

As represented by block 206, a local control manager may establish one or more streams and provide other session management functionality for local traffic. For example, a local mobility management entity ("MME") may set up one or more bearers to enable the access terminal 104 to communicate with a local service provider. To this end, the local MME may manage bearer setup, quality of service ("QoS"), and IP addresses for local service.

As represented by block 208, a network control manager also may establish one or more streams and provide other session management functionality for network traffic. For example, a network mobility management entity ("MME") may set up one or more bearers to enable the access terminal 104 to communicate with a network service provider. To this end, the network MME may manage bearer setup, quality of service ("QoS"), and IP addresses for core network service.

As represented by block 210, a local control manager also may manage paging and provide other mobility management functionality for local traffic. For example, when local traffic is received (e.g., at the access point 102) from a local service provider, a local mobility management entity ("MME") may cause the access point 102 to page the access terminal 104 in the event the access terminal 104 is currently in a sleep mode (e.g., a low-power mode). Here, since traffic is associated with local service, the local MME may initiate paging only at the access point 102 (as opposed to any other neighboring access points).

As represented by block 212, a network control manager may manage paging and provide other mobility management functionality for network traffic. For example, when network traffic is received (e.g., at the first hop router 106), a network mobility management entity ("MME") may cause the access terminal 104 to be paged if the access terminal 104 is currently in a sleep mode. Here, since the received traffic may be normal network traffic, the network MME may initiate paging according to standard network paging rules.

For example, the access terminal 104 may be paged by all of the access points associated with one or more tracking areas, one or more zones, and so on, or the access terminal 104 may be paged based on distance-based paging rules, or other types of paging rules.

Figure 3:
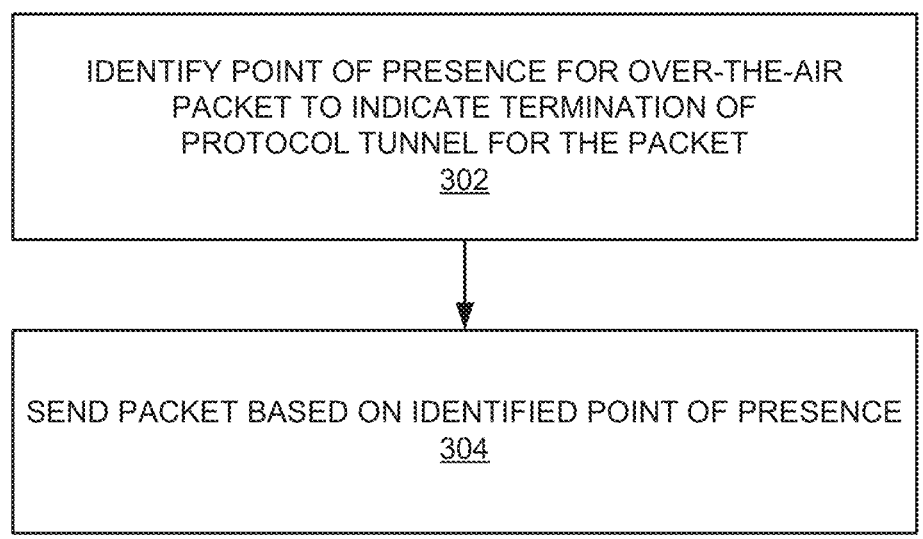
FIG. 3 is a flowchart of several sample aspects of operations that may be performed in conjunction with identifying point of presence for an over-the-air packet.
Figure 4:
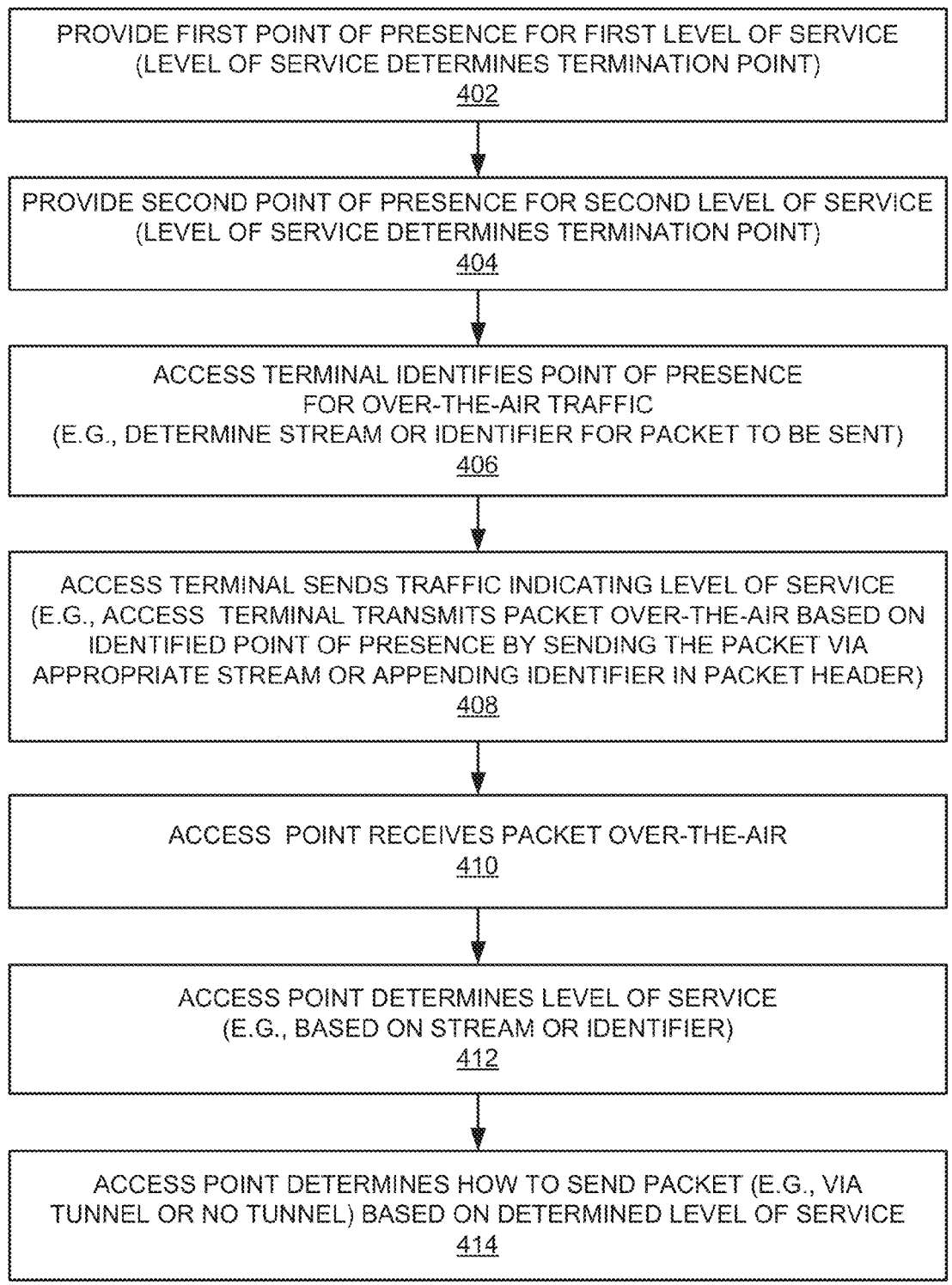
FIG. 4 is a flowchart of several sample aspects of operations that may be performed in conjunction with determining level of service for an over-the-air packet.

Referring now to FIGS. 3 and 4, several operations relating to identifying points of presence in conjunction with local breakout are described. These operations may be employed, for example, to efficiently identify a termination point of a packet that is traveling over-the-air between an access terminal and an access point. For example, it may not be practical or possible for an access point that receives a tunneled packet from an access terminal to determine the IP destination of the packet. Consequently, several techniques are described for efficiently routing such a packet.

FIG. 3 describes these operations at a relatively high-level. As represented by block 302 of FIG. 3, initially a node may identify a point of presence for an over-the-air packet to indicate the termination of a protocol tunnel for the packet. The node may then send the packet based on the identified point of presence (block 304). As will be described in more detail in FIG. 4, these high-level operations may be performed at an access terminal and at an access point. For example, an access terminal may determine the point of presence for a packet to be sent, then send the packet over-the-air based on this determination. Conversely, an access point may determine the point of presence for a packet received over-the-air, then forward the packet based on the identified point of presence.

Referring now to FIG. 4, as represented by blocks 402 and 404, different IP points of presence may be provided for an access terminal to enable the access terminal to access different levels of service. Here, each level of service may determine a different termination in a network for packets. In other words, a level of service may indicate where a packet from the access terminal is to come out in the network. For example, a level of service may indicate whether the packets are to be tunneled (e.g., a local level of service may indicate there is no tunnel while a core network level of service may indicate that there is a tunnel). As another example, a level of service may indicate that packets are to be sent via a tunnel that terminates in a visited network and/or in a core gateway. As yet another example, a level of service may indicate that packets are to be sent via a tunnel that terminates in a home network and/or in a core network gateway. It should be appreciated that a level of service may be indicated in various ways (e.g., by a number, by ASCII text, etc.).

As represented by block 406, when an access terminal needs to send a packet over-the-air to an access point, the access terminal may identify the point of presence for that traffic. As discussed above, in some aspects the point of presence may relate to different levels of service (e.g., local traffic or network traffic). In some aspects the point of presence is indicative of the PSN gateway at the endpoint of the tunnel. Thus, in some aspects the point of presence may serve to indicate the depth within a network of that endpoint (e.g., which may be located at a home network or a visited network).

In some implementations different levels of service may be associated with different streams (e.g., associated with different quality of service parameters). For example, a first level of service may be associated with a first set of one or more streams while a second level of service may be associated with a second set of one or more streams. Thus, the operations of block 406 may involve identifying the particular stream on which the over-the-air packet is to be sent (e.g., by identifying a stream from the corresponding set) for a given level of service. Such streams may take different forms in different implementations. For example, in an LTE-based implementation different sets of streams may relate to different sets of data radio bearers ("DRBs").

In some implementations different levels of service may be identified through the use of unique identifiers that are associated with the levels of service. For example, such an identifier may be sent with the packet when it is transmitted over-the-air. Accordingly, in this case the operations of block 402 may involve determining the identifier associated with the level of service for the packet to be sent over-the-air.

As represented by block 408, the access terminal then sends traffic indicating the level of service. As discussed above, in some implementations this may involve sending the packet over-the-air via an appropriate stream. Conversely, in other implementations this may involve sending an appropriate identifier with the packet. In some implementations this identifier may be sent via a packet header. For example, a special packet header that includes the identifier may be inserted between the IP packet header and the air interface packet header (e.g., an RLP header) for the packet.

As represented by block 410, the access point will then receive the packet over-the-air. As represented by block 412, the access point may then determine the level of service for the packet. For example, the access point may identify the level of service by determining the stream upon which the packet is sent or by reading an identifier that was sent with the packet.

As represented by the block 414, the access point determines how to send the packet based on the determined level of service. Based on the level of service, the access point may determine the termination (e.g., endpoint) for the packet in the network. For example, as mentioned above, the level of service may indicate whether the packet is to be tunneled or not tunneled. If the packet is to be tunneled, the level of service may indicate where the tunnel terminates (e.g., a visited network, an edge gateway, a home network, a core network gateway). In other words, in some aspects the endpoint for the packet may correspond to the termination of a protocol tunnel through which the packet is sent from the access terminal to another node (e.g., the first hop router 106 or a local service provider of FIG. 1). Consequently, the packet may be routed to the designated endpoint (e.g., associated with a network service or local service) in a relatively efficient manner.

Figure 5:
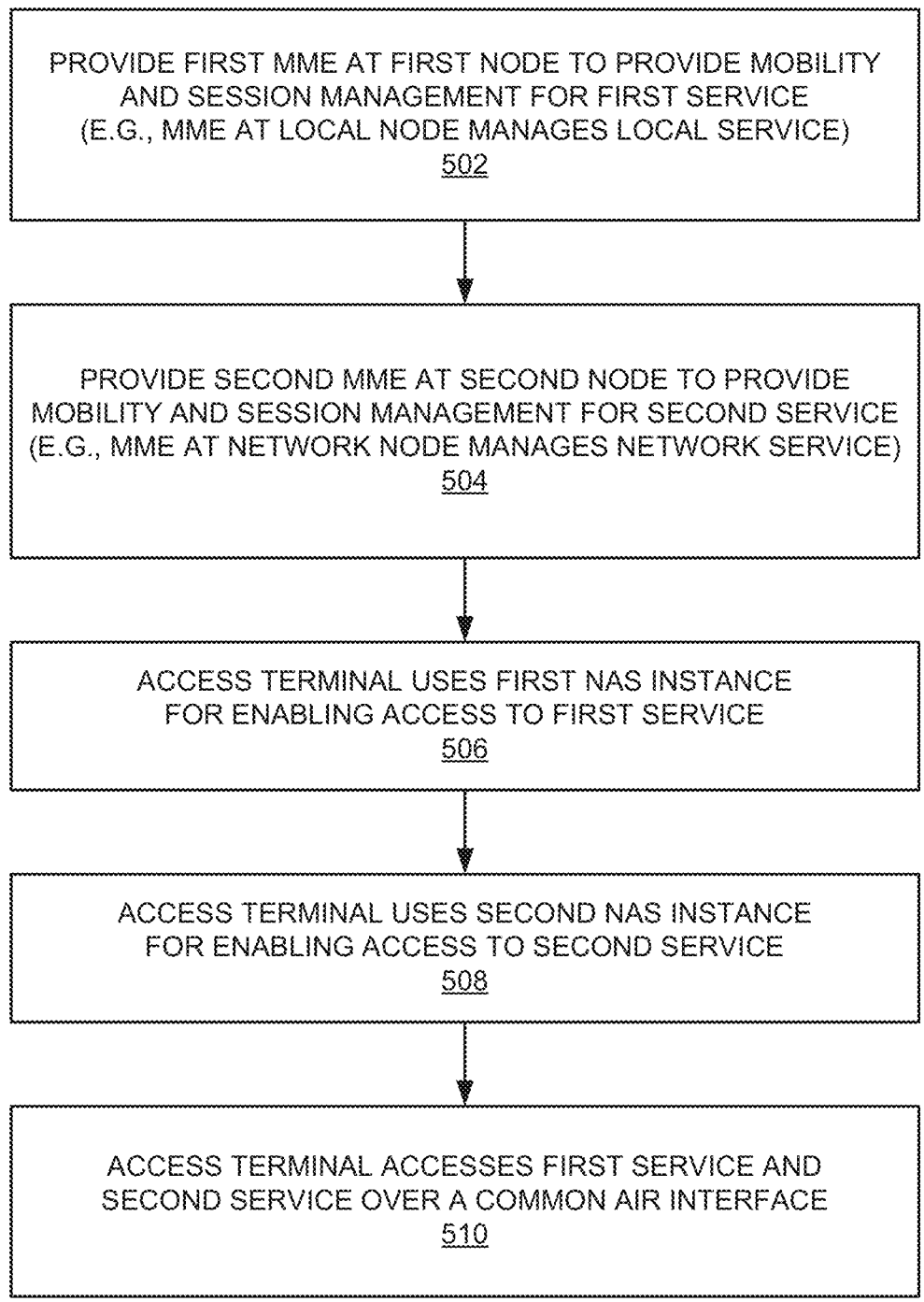
FIG. 5 is a flowchart of several sample aspects of operations that may be performed in conjunction with providing distributed control management functionality.
Figure 6:
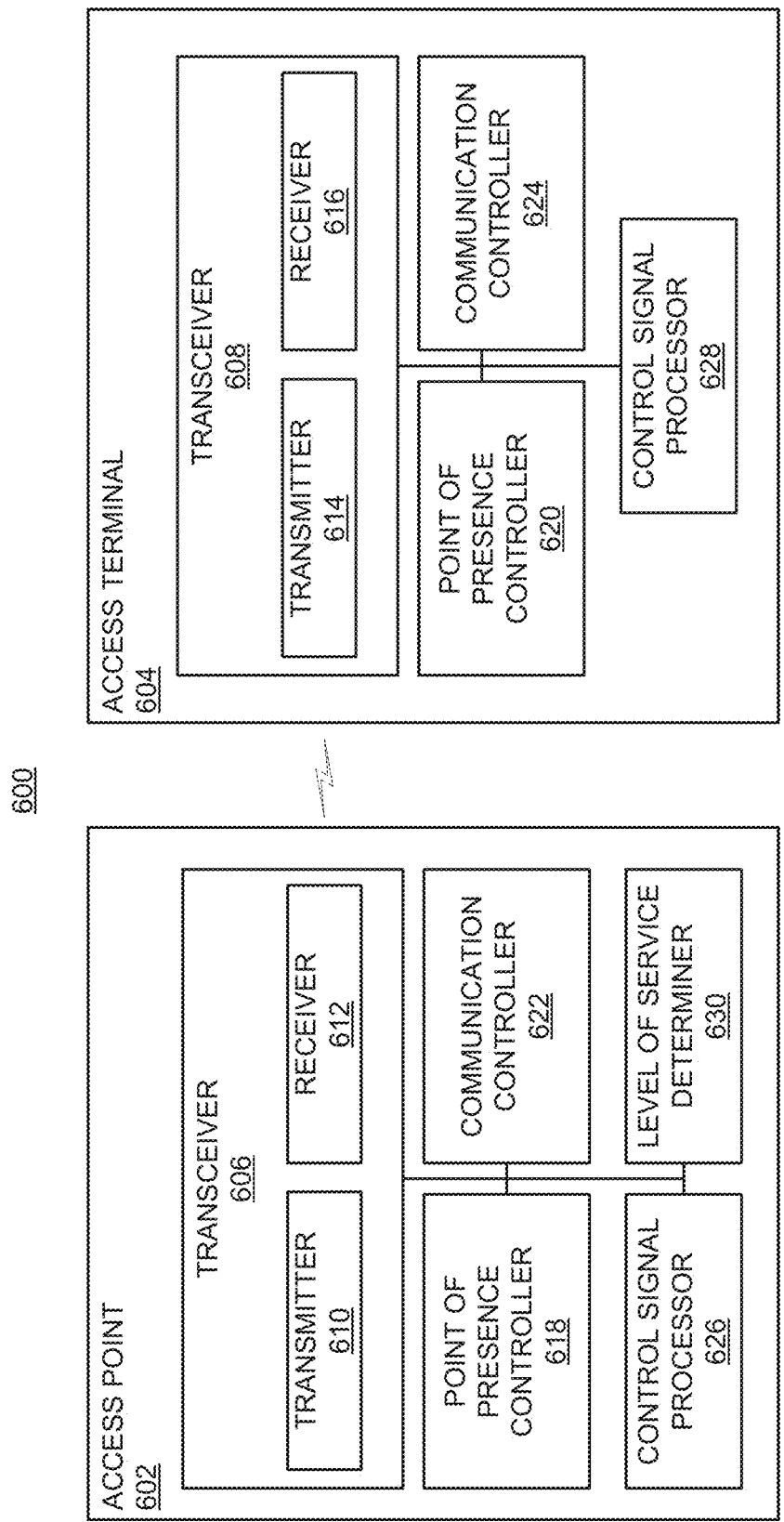
FIG. 6 is a simplified block diagram of several sample aspects of components of wireless nodes that may be employed in conjunction with providing local breakout.

Referring now to FIG. 5, several operations relating to the use of distributed MMEs will be described. Blocks 502 and 504 relate to operations that may be performed in implementations where some MME functionality for an access terminal is provided at a one node while other MME functionality for the access terminal is provided at another node.

As represented by block 502, a first MME may be provided at a first node (e.g., a local node). For example, as will be described in more detail in conjunction with FIG. 7 below, local MME functionality may be implemented at an access point. This local MME may provide, for example, bearer and paging management and other mobility and session management for local breakout traffic that flows to and from the access terminal.

As represented by block 504, a second MME may be provided at another node in the system. For example, core network MME functionality may be implemented at a core network node. This network MME may provide, for example, bearer and paging management and other mobility and session management for core network traffic that flows to and from the access terminal.

Blocks 506 and 508 relate to operations that may be performed in conjunction with supporting multiple instances of control signaling to facilitate access to different services. For example, an access terminal may support multiple NAS instances for communicating with different MMEs at different nodes.

As represented by block 506, the access terminal communicates with the first MME via first control signaling (e.g., control plane traffic that terminates at an MME). For example, the access terminal may support a first NAS instance for communicating with a local MME to facilitate access to one or more local services.

As represented by block 508, the access terminal communicates with the second MME via second control signaling. For example, the access terminal may support a second NAS instance for communicating with a network MME to facilitate access to one or more network services.

In some aspects NAS signaling is used for mobility management and session management. For example, mobility management may include managing mobility and managing paging for the access terminal. In addition, session management may include managing bearer setup, QoS, and different IP addresses for the access terminal. Here, NAS signaling relates to control plane messaging between the access terminal and a control manager (e.g., an MME), and is distinguished from access stratum ("AS") between an access terminal and an associated access point that controls the radio access (e.g., establishes a route for NAS signaling over the air interface). Also, it should be appreciated that the NAS signaling for all of the NAS instances may be routed through the same (i.e., a common) air interface between the access terminal and the associated access point.

As represented by block 510, the access terminal may then access the first service and the second service via the common air interface. Here, access to the first service is enabled by the first NAS instance and access to the second service is enabled by the second NAS instance.

FIG. 6 depicts several components that may be employed in nodes such as an access point 602 and an access terminal 604 to provide local breakout-related functionality as taught herein. It should be appreciated that the described components also may be incorporated into other nodes in a communication system. For example, other nodes in a system may include components similar to those described for the access point 602 and the access terminal 604 to provide similar functionality. In addition, a given node may contain one or more of the described components. For example, a node may contain multiple transceiver components that enable the node to operate on multiple frequencies and/or communicate via different technology.

As shown in FIG. 6, the access point 602 and the access terminal 604 may include respective transceivers 606 and 608 for communicating with one another and with other nodes. The transceiver 606 includes a transmitter 610 for sending signals (e.g., messages and packets) and a receiver 612 for receiving signals. Similarly, the transceiver 608 includes a transmitter 614 for sending signals and a receiver 616 for receiving signals.

The access point 602 and the access terminal 604 include other components that may be used in conjunction with local breakout operations as taught herein. For example, the access point 602 and the access terminal 604 may include respective point of presence controllers 618 and 620 for providing (e.g., defining and/or maintaining) multiple points of presence for accessing different services (e.g., local service and network service), and for providing other related functionality as taught herein. The access point 602 and the access terminal 604 may include respective communication controllers 622 and 624 for sending and receiving traffic (e.g., traffic indicating different levels of service, messages, and packets), for accessing services, for determining how to send a packet (e.g., via a tunnel or no tunnel) and for providing other related functionality as taught herein. The access point 602 and the access terminal 604 may include respective control signal processors 626 and 628 for sending and/or receiving control signaling (e.g., to/from an MME), for supporting (e.g., using and/or defining) multiple NAS instances, and for providing other related functionality as taught herein. The access point 602 may include a level of service determiner 630 for determining a level of service, and for providing other related functionality as taught herein.

The teachings herein may be applicable to a variety of communication systems. For example, the techniques described herein may be implemented in an Ultra Mobile Broadband-based ("UMB-based") system, a Long Term Evolution-based ("LTE-based") system, or some other type of communication system. For illustrations purposes, several sample implementation details will be described in the context of an LTE-based communication system in the discussion that follows in conjunction with FIGS. 7-15. In addition, several sample implementation details will be described in the context of a UMB-based communication system in the discussion that follows in conjunction with FIGS. 16-18B. It should be appreciated that some or all of the components and/or operations discussed below may be incorporated into other types of communication systems.

Figure 7:
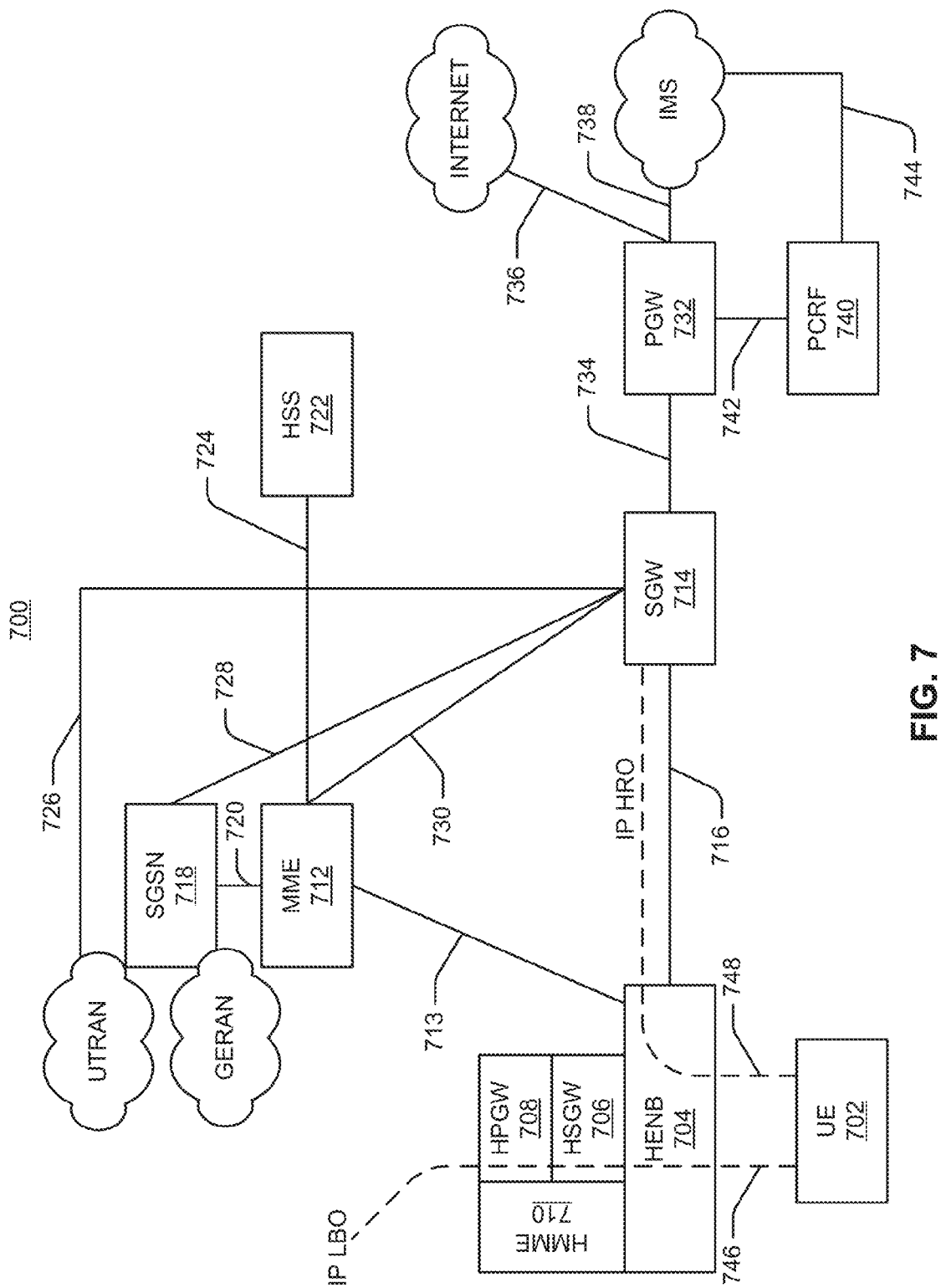
FIG. 7 is a simplified block diagram of several sample aspects of a wireless communication system configured to provide local breakout.

FIG. 7 illustrates several nodes in a sample communication system 700 that comprises, for example, a portion of an LTE-based network including UMTS terrestrial radio access network ("UTRAN") components, GSM edge radio access network ("GERAN") components, and evolved packet core ("EPC") components. In this example, user equipment ("UE") 702 communicates over-the-air with a Home eNodeB ("HENB") 704 (and potentially other UTRAN network elements, not shown).

To facilitate local breakout, a portion of the functionality that is conventionally implemented in the network is instead implemented at the HENB 704. Specifically, co-located with the HENB 704 are a home serving gateway ("HSGW") 706, a home packet data network gateway ("HPGW") 708, and a home MME ("HMME") 710. For convenience, these co-located components may be referred to herein as a local SGW, a local PGW, and a local MME, respectively. In addition, the HENB 704 and the co-located components may be referred to herein as collectively comprising a femto node.

The system 700 employs various protocols to facilitate communication between the illustrated functional modules. For example, the HENB 704 may communicate with an MME 712 (e.g., a core network MME) via an S1 protocol as indicated by line 713. The HENB 704 may communicate with an SGW 714 (e.g., a network SGW) via an S1 protocol as indicated by line 716. The MME 712 may communicate with a serving GPRS support node ("SGSN") 718 via an S3 protocol as indicated by line 720. The MME 712 also may communicate with a home subscriber server ("HSS") 722 via an S6a protocol as indicated by line 724. The SGW 714 may communicate with other UTRAN components via an S12 protocol as indicated by line 726, with the SGSN 718 via an S4 protocol as indicated by line 728, with the MME 712 via an S11 protocol as indicated by line 730, and with a PSN gateway (e.g., a network PGW) 732 via S5 and S8 protocols as indicated by line 734. The PGW 732 may communicate with packet data network entities such as the Internet and an IP multimedia subsystem ("IMS") via SGi protocols as indicated by lines 736 and 738, respectively. Also, a policy and charge rules function ("PCRF") 740 may communicate with the PGW 732 via Gx protocol as indicated by line 742 and the IMS via Rx protocol as indicated by line 744.

The system 700 provides improved local breakout performance through the use of the HSGW 706, the HPGW 708, and the HMME 710. As described below, this improved performance may relate in some aspects to improved mobility management, bearer management, and paging management.

FIG. 7 illustrates that local traffic and network traffic are routed via different SGW and PGW entities. As represented by line 746, local breakout traffic for the UE 702 is routed via the HENB 704, the HSGW 706, and the HPGW 708 to/from a local service provider (not shown in FIG. 7). Conversely, as represented by line 748, network traffic (e.g., home routed traffic) may be routed via the HENB 704, the SGW 714, and the PGW 732 to/from a packet data network.

Figure 8:
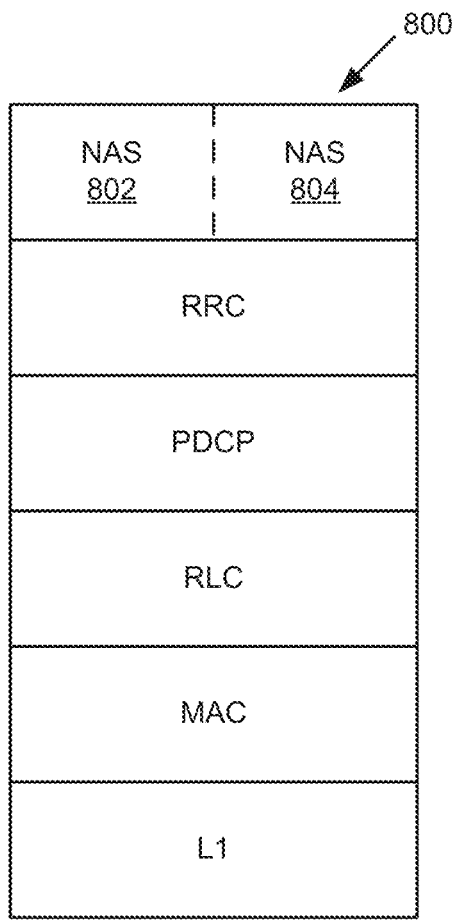
FIG. 8 is a simplified diagram of a sample control plane protocol stack.
Figure 9:
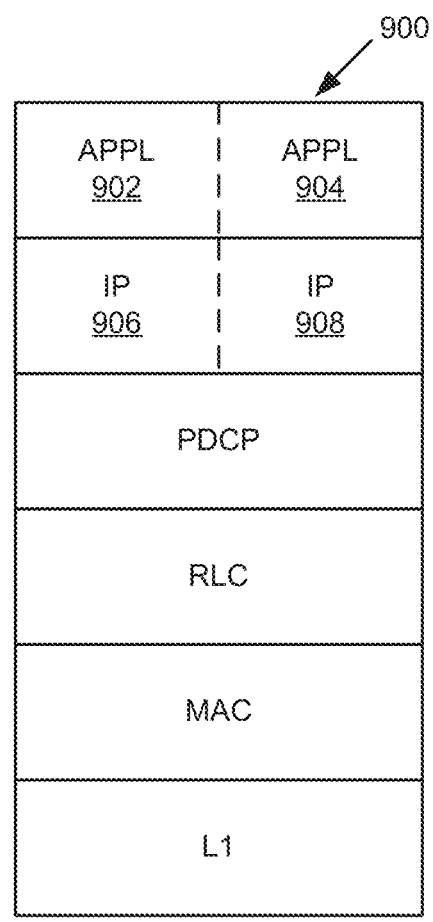
FIG. 9 is a simplified diagram of a sample data plane protocol stack.

To support the local traffic and the network traffic, a UE may run multiple (e.g., two) partial protocol stacks wherein an air interface between the UE and an associated HENB may be shared between the stacks. For example, FIG. 8 depicts a control plane protocol stack 800 that illustrates that a UE may support multiple NAS instances (NAS 802 and NAS 804 in this example). In addition, FIG. 9 depicts a data plane protocol stack 900 that illustrates that a UE may support multiple applications (APPL 902 and APPL 904), where each application is associated with a different IP interface (e.g., corresponding to IP 906 and IP 908).

Various provisions may be made for the data plane at the UE to support local traffic and network (e.g., home routed) traffic. As discussed below, in some implementations a UE may not be allowed to connect to a HENB local breakout unless the UA has been accepted by the core network. Thus, a UE may not be able to use local breakout services if the UE has not been authenticated by the core network or if the backhaul is not operational. Separate default bearers are set up for the local breakout path and the network path. From the perspective of the UE, local breakout traffic may simply look like another PDN. The UE is aware of different sets of bearers on the data plane. Different points of presence (e.g., APNs) distinguish the local breakout PDN from the network (e.g., macro) PDN. The UE will thus use the appropriate bearer for local breakout traffic versus network traffic. For example, the UE may send separate DHCP requests for local breakout traffic versus network traffic.

Various provisions also may be made for the control plane at the UE to support local traffic and network traffic. For example, a UE may use an appropriate cipher when communicating with the network (e.g., macro) MME. In contrast, the UE may not use a cipher (or may use a null cipher) when communicating with the HMME.

A new service request may be encrypted between the UE and the MME. Here, the HENB may not be able to distinguish whether the request is destined for the HENB (for local breakout) or the network. Accordingly, schemes such as those described above at FIGS. 3 and 4 may be employed here.

In one implementation, a single NAS SM layer is employed. Here, the UE may include a special bit in a header to indicate whether a NAS message is destined for the HMME or the network MME. When the HENB receives this message, it routes the packet to the appropriate destination based on this bit. In such an implementation, the UE may use different sequence numbers for messages associated with the HMME and the network MME.

In another implementation, separate NAS signaling bearers are provided for communicating with the HMME and the network MME. This implementation thus involves separation of the NAS SM layer. Here, the UE will put local breakout requests and network requests on the appropriate NAS signaling bearer. When the HENB receives a message on a given NAS signaling bearer, the HENB routes the packet to the appropriate destination based on the bearer.

The system 700 may provide other local breakout functionality that is similar to the functionality discussed above in conjunction with FIGS. 1-6. For example, an HENB may assign an IP address for a UE for local breakout. In addition, a UE may be paged for local breakout traffic. Also, an HENB may support QoS for local breakout traffic. Each of these aspects of local breakout will be discussed in turn.

Functionality such as UE IP address allocation, DHCPv4 and DHCPv6 functions, and neighbor discovery as defined in RFC 4861 may be employed to assign an IP address for the UE. To provide these functions, a reduced functionality HPGW may be provided at the HENB as shown in FIG. 7. Here, the HPGW may not support all of the functions of a conventional PGW (e.g., as deployed in a core network) but may instead support the above functions and any other functions that may be desired.

Examples of functionality that may be employed in conjunction with enabling the UE to be paged for local breakout traffic follow. Here, an SGW may buffer packets (e.g., provide ECM-IDLE mode downlink packet buffering). In addition, the SGW may support an initiation of network triggered service request procedure. The SGW may thereby alert an associated MME of the presence of traffic.

In response to such an alert, the MME may determine when and at which eNodeBs the UE will be paged. Thus, the MME may support UE reachability in ECM-IDLE state (e.g., including control and execution of paging retransmission). Here, paging by the MME does not need NAS signaling. Rather, the MME may simply communicate when to page a UE to the relevant eNodeB or eNodeBs (e.g., HENBs). The page is then broadcast by each eNodeB based on an identifier (e.g., GUTI, T-IMSI, IMSI, etc.) of the UE.

In some implementations mobility (e.g., service continuity) for local breakout traffic is not supported. In such a case, the UE may only be paged for the local breakout traffic at the corresponding HENB that provides the local breakout. However, mobility may still be applied to anchored traffic (e.g., anchored either in VPLMN or HPLMN). Such anchored traffic may be associated with, for example, a core PGW or some other anchored PDN. Here, the network MME may cause the UE to be paged for the anchored traffic at the HENBs and macro cells in the current tracking area list for the UE.

To provide the above SGW functions, a reduced functionality HSGW may be provided at the HENB as shown in FIG. 7. The HSGW may not support all of the functions of a conventional SGW (e.g., as deployed in a core network) but may instead support the above functions (e.g., provide the interface to the MME to support paging) and any other functions that may be desired.

In some implementations the above MME functions may be provided by including a reduced functionality HMME at the HENB as shown in FIG. 7. That is, the system may employ distributed MME functionality whereby functionality for different types of traffic is provided at different entities in the system (e.g., the HMME manages paging and bearers for local services and the network MME manages paging and bearers for network services). The HMME may not support all of the functions of a conventional MME (e.g., as deployed in a core network) but may instead support the above functions and any other functions that may be desired.

In other implementations the above MME functions may instead be provided through the use of an S11 protocol interface from the HSGW to the MME (not shown in FIG. 7). That is, instead of using the HMME as shown FIG. 7, the HSGW may communicate with a core network MME that provides all of the MME functionality. In some aspects, such an implementation may involve modifying the S11 protocol or may involve changing the MME to support multiple SGWs to change the paging behavior of the MME.

Certain efficiencies may be achieved through the use of distributed MME functionality (e.g., between HMMEs and core network MMEs) since the messages relating to local traffic may be routed from the HENB to the local MME rather than to a core network MME. Thus, the resulting architecture may avoid the use of one or more interfaces between the core MME and each HENB (e.g., S11 interfaces between the MME and the HSGWs). Moreover, the reduction in messaging traffic and workload at the core network associated with processing these messages may be significant when there are a large number of HENBs in the system.

Several examples of functionality that may be employed in conjunction with an HENB supporting QoS for local breakout traffic follow. In some cases, an uplink/downlink traffic flow template ("TFT") and a QoS class indicator ("QCI") are provided for each local breakout bearer to support QoS functionality.

Several procedures may be employed to establish the EPS bearer with the HPGW. In one procedure, the EPS bearer may be configured statically at the HPGW (e.g. per HENB instead of per UE). In another procedure an STA interface may be defined to the HMME from the AAA (access specific). This procedure may be a better choice in implementations where the HMME authenticates the UE as well. In yet another procedure, a Gx interface is defined to the HPGW (dynamically).

Various types of functionality may be implemented in the HPGW in conjunction with supporting QoS for local breakout traffic. For example, the HPGW may support per user packet-based filtering. The HPGW may support transport level packet marking in the uplink. In addition, uplink ("UL") and downlink ("DL") rate policing/shaping and gating control may be supported. Also, UL and DL bearer binding as defined in TS 23.203 may be supported.

Various types of MME functionality may be provided in conjunction with supporting QoS for local breakout traffic. For example, NAS signaling and bearer management functions (e.g., including dedicated bearer establishment) may be provided.

In implementations that employ an HMME (e.g., as shown in FIG. 7), the HMME may be used for the NAS signaling. This may imply that the UE is to support multiple MME NAS signaling instances. One method may involve defining a second radio bearer for the HENB MME. Then, based on which PDN is being used (e.g., for local traffic or network traffic), the UE selects the appropriate bearer. The use of multiple bearers may involve separate NAS security for each pair or may rely on RRC security.

In implementations that do not employ an HMME, the S11 interface to the core network MME may be used to support QoS for local breakout traffic. Such an implementation may involve modifying the S11 protocol or may involve changing the MME to support multiple SGWs to change how the bearers are set up by the MME.

In addition to the functionality described above, other functionality may be supported in conjunction with local breakout. For example, PGW functions such as lawful interception and accounting functions may be supported. Examples of accounting functions include UL and DL service level charging and UL and DL service level gating control as defined in TS 23.203. In addition, MME functions such as tracking area list management may be supported. Here, the tracking area list for local breakout may only designate the HENB that provides the local breakout.

Figure 10:
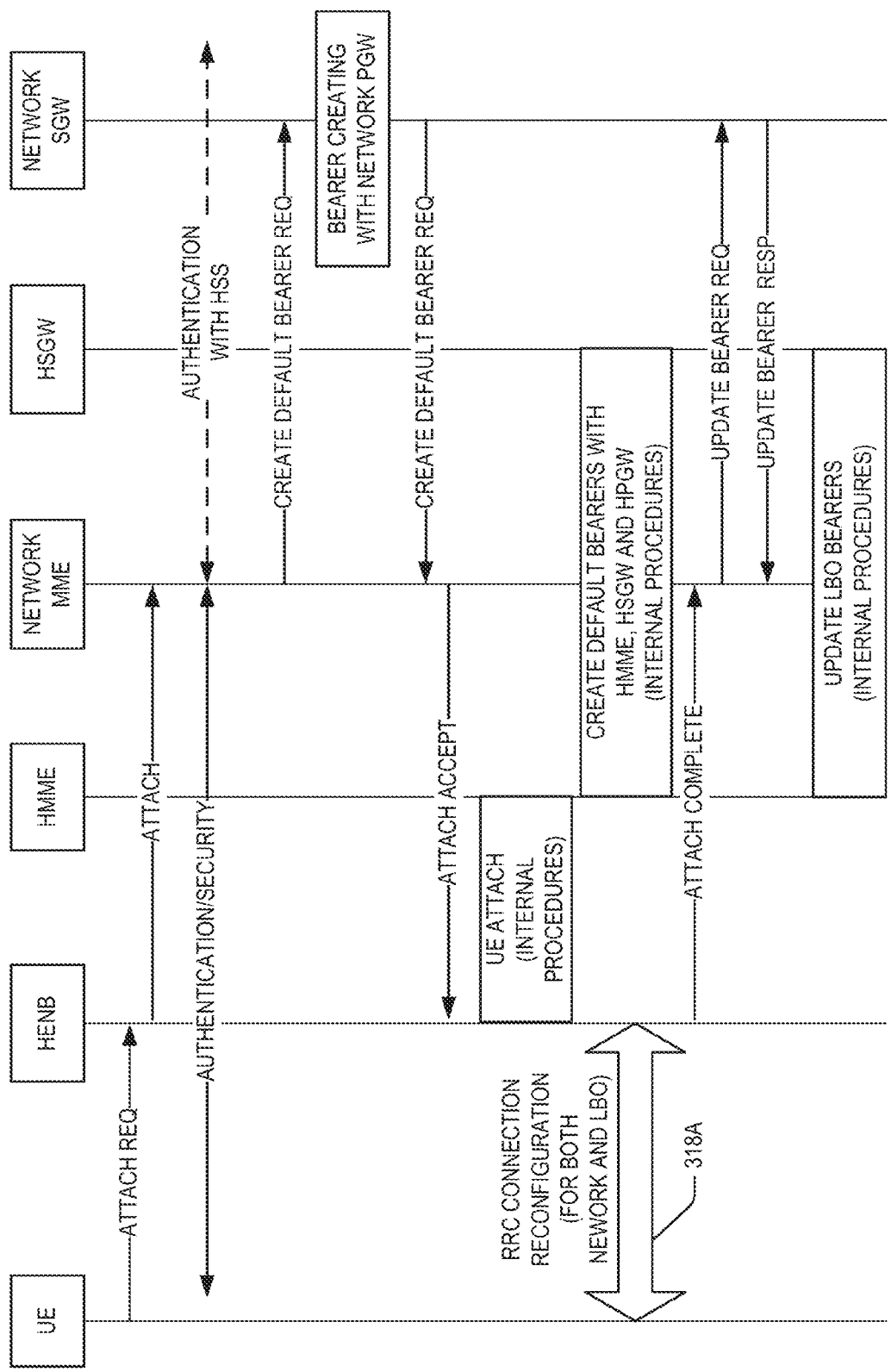
FIG. 10 is a simplified diagram illustrating sample attach call flow.
Figure 11:
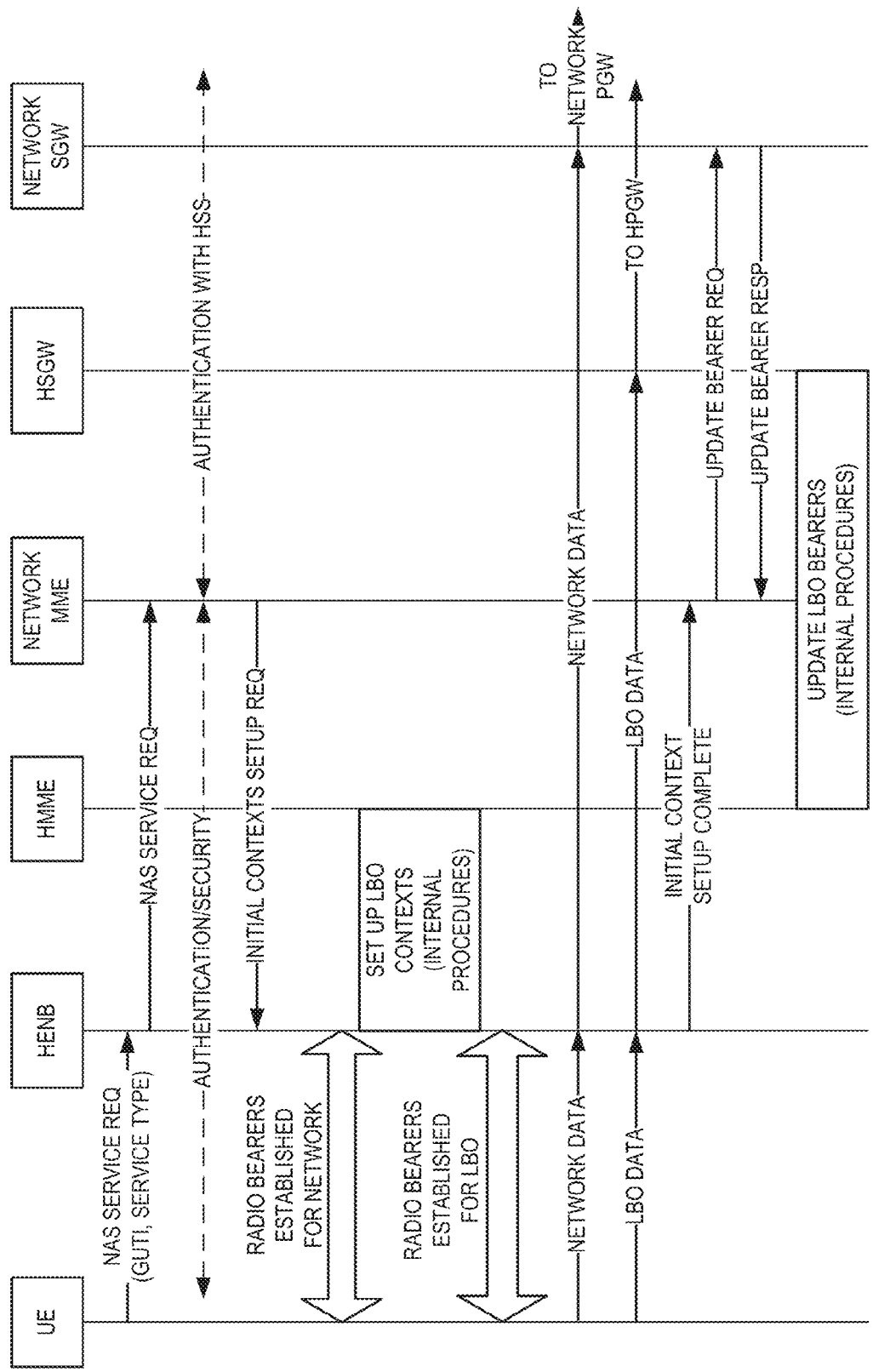
FIG. 11 is a simplified diagram illustrating sample triggered service request call flow.
Figure 12:
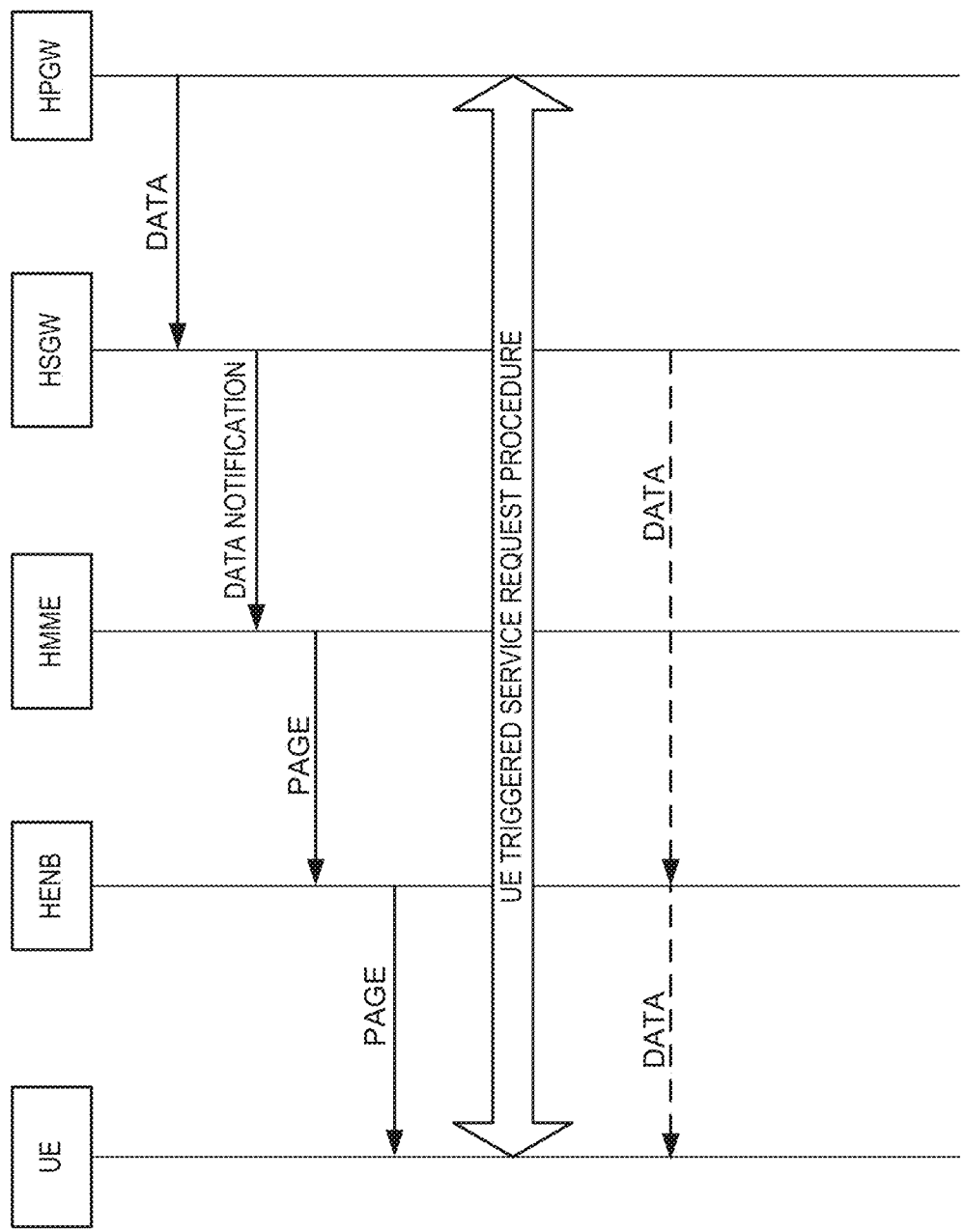
FIG. 12 is a simplified diagram illustrating sample triggered service request call flow.
Figure 13:
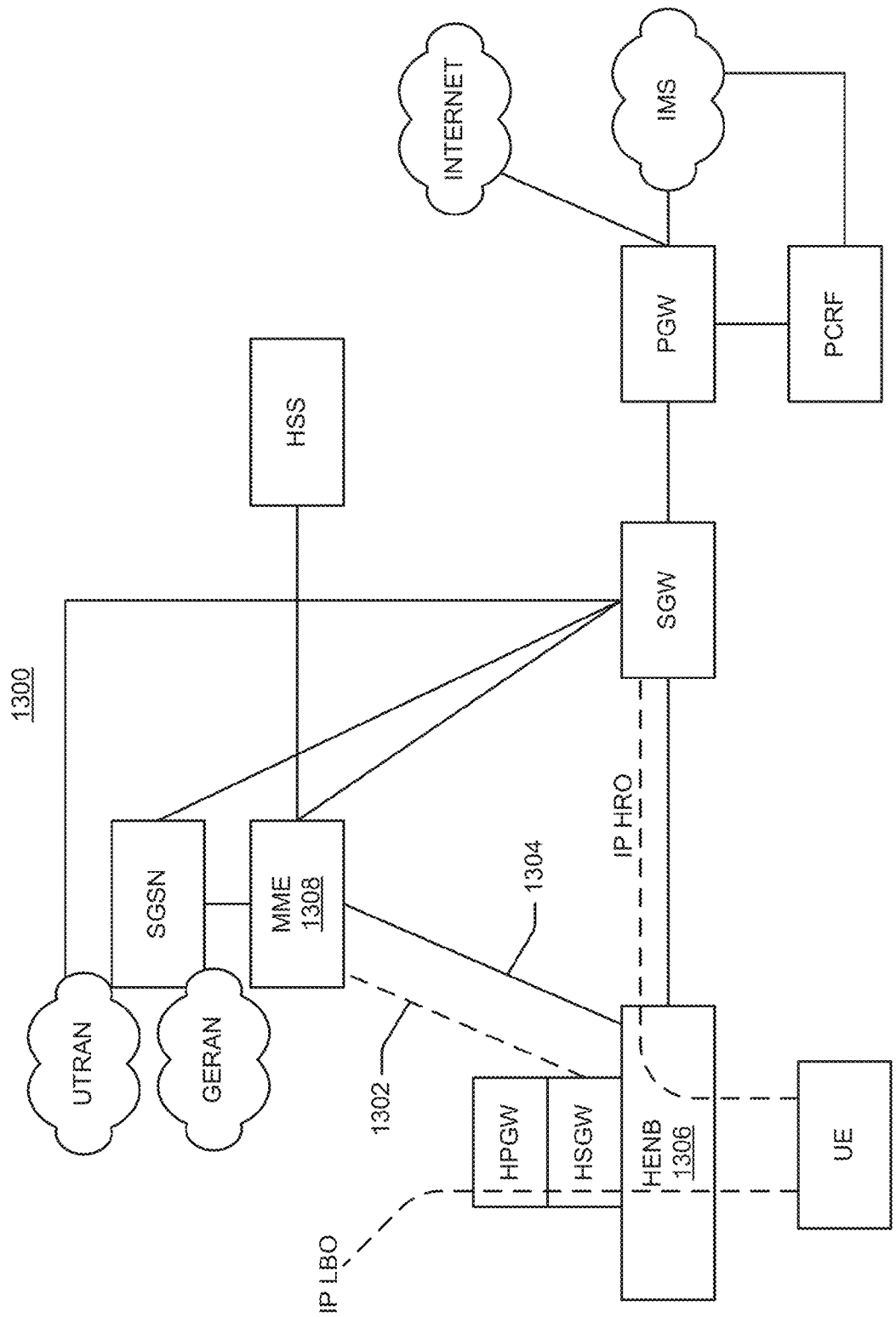
FIG. 13 is a simplified block diagram of several sample aspects of a wireless communication system configured to provide local breakout.

Referring now to FIGS. 10-12, several examples of call flow that may be employed in the system 700 will be described. In some implementations a UE may send an indication to an access point to inform the access point that the UE is capable of receiving local services.

FIG. 10 describes sample attach call flow. Initially, the UE communicates with a single core network MME (e.g., a macro MME) over NAS. The UE sends an attach request to the HENB (e.g., to a femto node), and this request is forwarded by the HENB to the network MME. The information provided in the attach request from the UE may include, for example, IMSI or GUTI that may be used by the HENB to find the MME, the last visited tracking area identifier (if applicable), UE network capability, PDN address allocation (IP version, when to allocate address), protocol configuration options, attach type, KSI, NAS sequence number, and NAS-MAC. In some cases, some of this information may be encrypted. However, the UE may need to send some information in the clear so that the HENB will be able to determine whether the UE is capable of accessing local breakout services.

Referring again to FIG. 10, the UE communicates with the network MME to perform authentication and security operations. Here, the UE may be authenticated to the HSS (not shown in FIG. 10).

In addition, default bearers are set up for the network. Here, the network MME sends a create default bearer request. The network SGW cooperates with the network PGW to create the bearer and replies with the create default bearer message.

The network MME then sends an attach accept message to the HENB. The information provided in the attach accept may include, for example, APN, GUTI, PDN address information, TAI list, EPS bearer identity, session management configuration IE (e.g. including UL TFT), or call configuration options, KSI, NAS sequence number, NAS-MAC, and NAS security algorithm. Again, some of this information may be encrypted.

The HENB then assists the HMME setting up the default bearers for the local breakout. For example, the HENB may pass on the attach request to the HMME when the HENB receives the attach accept from the network MME. The default bearers for local breakout may then be created by cooperation of the HMME, the HSGW, and the HPGW. RRC connection reconfiguration messages may then be sent for both local breakout and network traffic, and the attach procedure is completed. From the above it may be seen that the UE maintains separate EPS bearers for local breakout traffic and network traffic.

Appropriate procedures may be employed in the event dedicated local breakout bearers are needed at a later point in time. For example, the UE may signal for local breakout using a special NAS bit. This packet may be routed to the HMME. Local signaling between the HMME and the HSGW sets up a new bearer. The HMME may communicate with the PCRF to learn local breakout policies for the UE.

FIG. 11 describes sample UE triggered service request call flow. Here, the HENB may set up local breakout contacts based on information it acquires and maintains. For example, the GUTI of the UE may be known at the HENB. Depending on the service type (e.g., data versus signaling), the MME may activate EPS bearers or not. In some implementations, the HMME may activate local breakout EPS bearers only if network EPS bearers are being activated.

The UE sends an NAS service request message including, for example, GUTI, TMSI, service type, and other information. The HENB sends the NAS service request to the network MME. After authentication, initial context are set up. Radio bearers are established for the network and for local breakout. Once the bearers are set up, network data may be sent from the UE to the HENB, then from the HENB to the network SGW, then to the network PGW. Local breakout data may be sent from the UE to the HENB, then from the HENB to the HSGW, and then to the HPGW.

FIG. 12 describes sample HENB (e.g., femto) triggered service request call flow. In implementations where a macro connection is needed for authentication, a service request triggered by an HENB for local breakout may set up EPS bearers with the network. This step may be avoided, however, if the service request indicates it is for local breakout only. In such a case, the network MME may not activate any network EPS bearers.

When local data appears at the HPGW, the data is forwarded to the HSGW and the HSGW notifies the HMME that local data has been received. This triggers a page at the HMME whereby the HMME sends a message (e.g., a page request) to the HENB to cause the HENB to page the UE. The UE triggered service request procedure may then follow, after which the data may be sent from the HSGW to the UE via the HENB.

The HENB may learn the paging cycle information ahead of time. For example, paging DRX for the UE may be included in the paging message. In some implementations DRX is included as an information element ("IE") in the UE context. Here, when the UE context is fetched by the HENB, the HENB relays the DRX to the HMME. In such an implementation, local breakout applications may not be allowed to enforce tighter paging cycles. In other implementations, a different DRX (e.g., integral multiples) may be used by HENBs (e.g., femto nodes) and macro cells. In such a case, the UE will wake up on the appropriate cycle depending on the cell at which the UE is currently idling. Here, the UE will recognize multiple MME controls. In the event the UE wakes up on a slower cycle, the UE will receive a page when the two cycles match.

The use of local breakout may have relatively minimal impact on tracking area updates. For example, a HENB may advertise a single tracking area. That is, a separate tracking area may not be defined for local breakout traffic. A UE may perform a tracking area update with the network MME. Here, the UE uses a network bearer and the associated NAS message is routed directly to the network MME. The HMME need not be aware of the tracking area update. Rather, the HMME may only page for local breakout traffic and may only page at the associated HENB.

Various provisions may be employed to handle local breakout connectivity when a UE goes idle. In some implementations the IP may be immediately disconnected. Thus, all bearers will be torn down and the connection will need to be reconnected when the UE reappears. In other implementations the IP address may be maintained (e.g., for a defined period of time). Here, if the UE reappears with the same GUTI (or S-TMSI), the UE will be able to continue to use the existing bearers. In addition, a trigger may be employed to qualify the UE as having left the HENB. For example, a defined number of missed pages may trigger the MME to tear down the bearers.

As mentioned above, some implementations may not employ an HMME. Several aspects of such a system will be treated with reference to system 1300 of FIG. 13 (e.g., where the illustrated modules may have similar functionality as correspondingly named modules of FIG. 7). In such a case, the HSGW may communicate with a core network MME via an S11 protocol as represented by dashed line 1302 in FIG. 13. The S11 messages to be sent between the HSGW and the network MME may include, for example, create bearer (default or dedicated), delete bearer, update bearer, dedicated bearer deactivation, bearer resource allocation, bearer resource release, create forwarding tunnel, and other GTP-C messages (e.g., echo). In such a case, network initiated service requests are to be distinguished by the network MME as originating from the HSGW versus the network AGW. A UE initiated request for local breakout will travel from the UE to the HENB, then to the network MME, and finally to the HSGW. An HSGW may send a page request to the network MME (e.g., with an indication to page only at the HENB). The page will travel from the HPGW to the HSGW, then to the network MME, and finally to the HENB.

In implementations that do not employ an HMME, two different reference points (S1 and S11) are supported by the home node. This results in more complexity at the HENB and support of, for example, GTP-C and eRANAP. To simplify this architecture, messages conventionally associated with S11 may instead be carried by S1. In other words, some messages that are defined in S11 may be piggybacked into the S1-MME signaling. For example, the message to create bearers that may otherwise be carried over S11 between the network MME and the HSGW may instead be carried over S1 between the network MME and the HENB. Thus, the S11 interface may be eliminated in this case.

Figure 14:
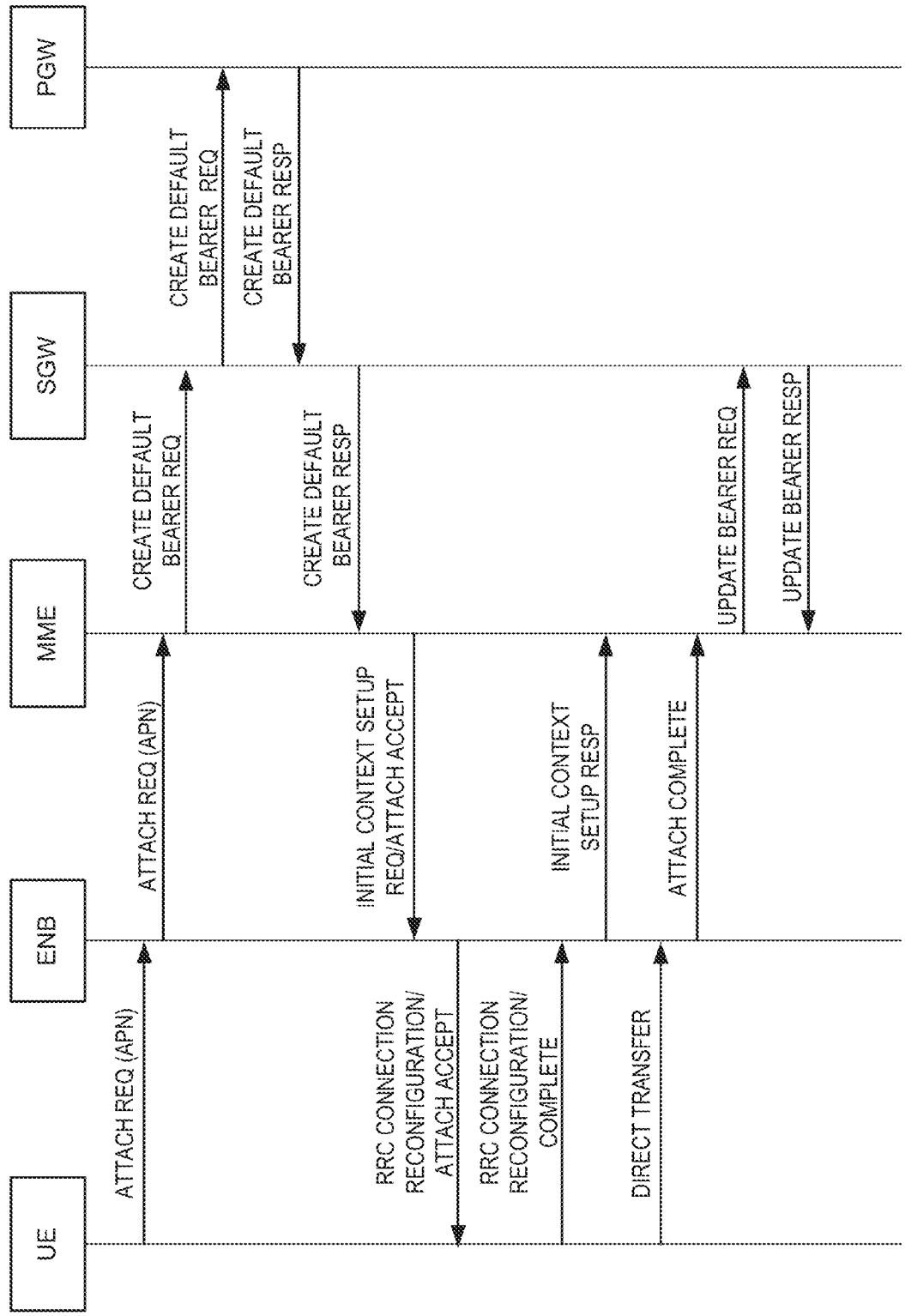
FIG. 14 is a simplified diagram illustrating sample attach call flow.
Figure 15:
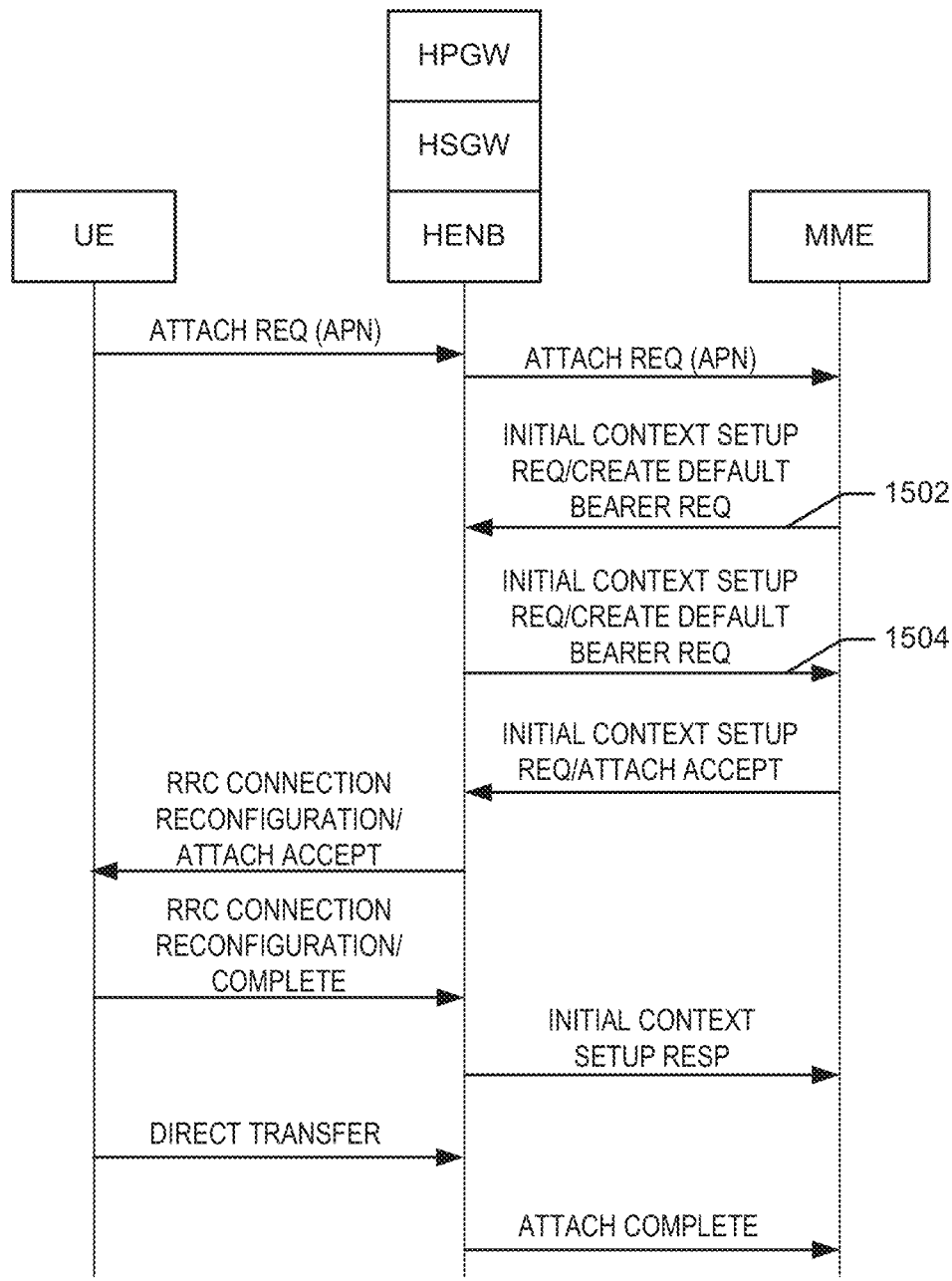
FIG. 15 is a simplified diagram illustrating sample attach call flow where messages associated with one protocol are carried over another protocol.

FIGS. 14 and 15 compare attach procedures for local breakout for the two cases where an S11 interface is used and is not used, respectively.

In FIG. 14 the UE sends an attach request (e.g., including an APN ID) to the eNB and this request is forwarded by the eNB to the MME. Default bearers are then set up for the network. Here, the MME sends a create default bearer request to the SGW, which forwards the request to the PGW. The PGW replies with the create default bearer message that is forwarded by the SGW to the MME. The MME then sends an attach accept message to the eNB. RRC connection reconfiguration messages may then be sent, and the attach procedure completes.

In contrast, as represented by line 1502 in FIG. 15, the MME sends an initial context setup request message and a create default bearer request message back to the HENB in response to an attach request (e.g., that includes a value of APN that triggers a new attach). As represented by line 1504, the HENB then sends an initial context setup response message and a create default bearer response message back to the MME. A similar approach may be used to establish subsequent dedicated bearers. Advantageously, the "S11" messages represented by lines 1502 and 1504 are carried over the S1 connection (e.g., via line 1304 between HENB 1306 and MME 1308 in FIG. 13).

Figure 16:
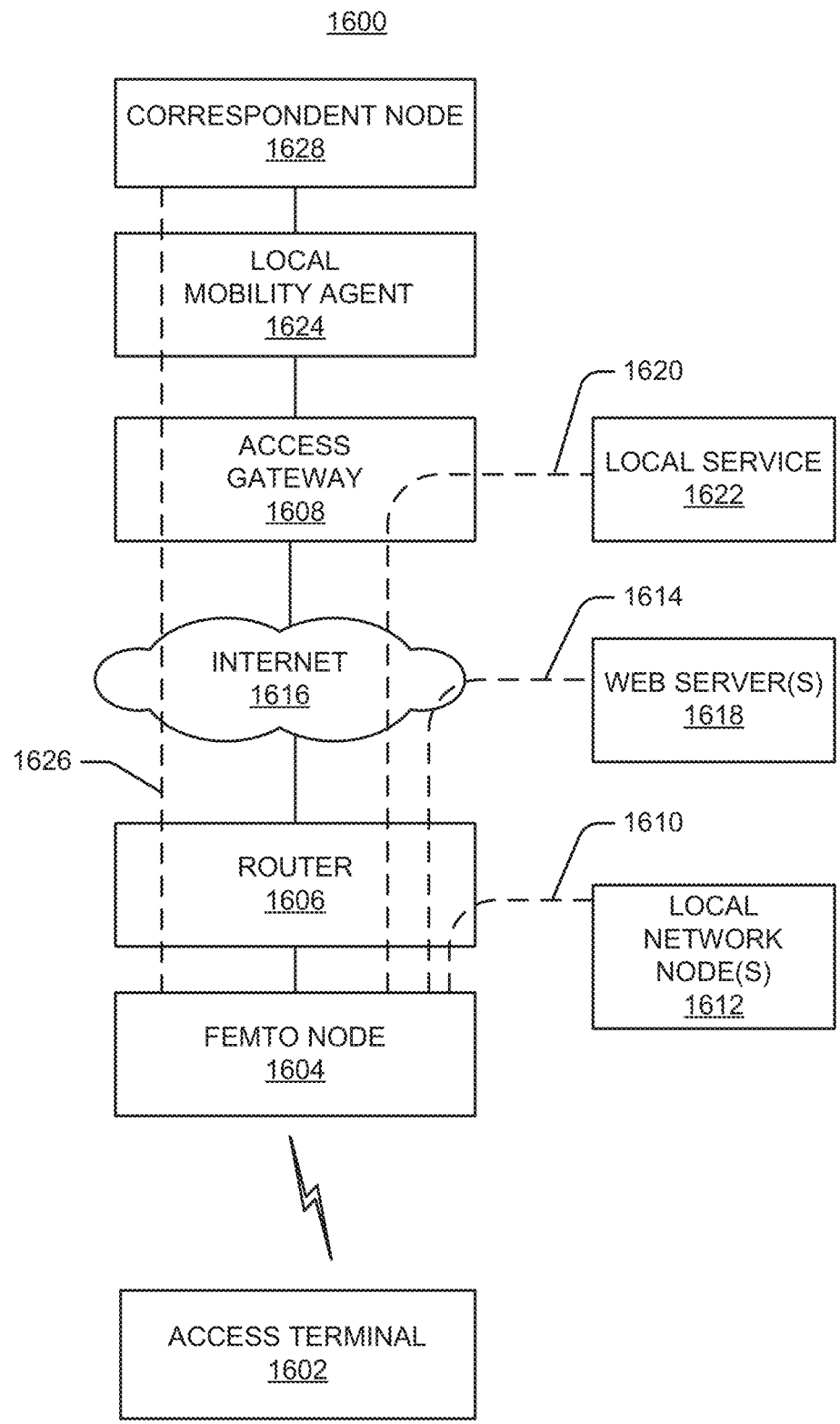
FIG. 16 is a simplified block diagram of several sample aspects of a wireless communication system configured to provide local breakout.

Referring now to FIGS. 16-18B, sample components and procedures that may be employed in a communication system such as a UMB network to provide local breakout will be described. Local breakout allows an access terminal to access local services that are visible under one of the devices on the path from the access terminal to its first hop router. Two main forms of local breakout are shown in FIG. 16: local breakout at an access gateway and local breakout at a femto node. It should be appreciated that the local services provided by a given node may take various forms and may be different than the specific services depicted in FIG. 16 and discussed below.

In the system 1600 of FIG. 16, an access terminal 1602 communicates with a femto node 1604 (e.g., an enhanced base station, eBS) over an air interface. The system 1600 includes a router 1606 and an access gateway 1608 that provide local breakout to one or more local services.

Local breakout at the femto node may be provided once the access terminal 1602 is connected to the femto node 1604. As represented by dashed line 1610 the router 1606 may enable the access terminal 1602 to access local services provided by one or more local network nodes 1612. For example, such a local service may provide access to devices (e.g., printers) on a local network. As represented by dashed line 1614, the router 1606 also may enable the access terminal 1602 to access the Internet 1616 (e.g., access one or more web servers 1618). In this way, the access terminal 1602 may access the Internet without going through the operator's core network.

As represented by dashed line 1620, the access gateway 1608 may enable the access terminal 1602 to access one or more local services 1622. Local breakout at the access gateway may be applicable when the first hop router for the access terminal 1602 is the local mobility agent 1624. Here, it may be desirable to provide special local services (e.g., position location) from a local access gateway, even when the globally routed packets travel via the local mobility agent 1624.

As represented by dashed line 1626, core network traffic may be routed from the access terminal 1602 to the local ability agent 1624 (e.g., the first hop router) via a protocol tunnel. From here, the traffic may be routed through the core network to a correspondent node 1628. Complementary traffic flow will occur on the downlink.

To support local breakout, multiple LinkIDs may be provided between a given access terminal and an eBS. Here, each LinkID may belong to a level that corresponds to the entity that administers the IP address at that level. For example, a level 2 LinkID may correspond to the local mobility agent. A level 1 LinkID may correspond to the access gateway. A level 0 LinkID may correspond to the local router.

The application interface specification ("AIS") supports the location of multiple LinkIDs by the eBS to the access terminal. Each LinkID corresponds to a different IP interface, and the access terminal is allocated a different IP address administered by the entity controlling the interface.

Packets traveling over-the-air between the access terminal and the eBS are identified into the link level to which they belong. As discussed above, two ways of accomplishing this may involve identifying the stream for the packet or sending an identifier with the packet.

In the first case, each packet belongs to a stream, and there may be a many-to-one mapping between a stream and a link. Thus, a link may host multiple streams, but a stream may only belong to a single link level. Consequently, the link level may be implicitly determined from the stream ID.

In the second case, the packets may carry a special one byte header placed between the IP header and the RLP header. This header may exclusively include the link level.

Given the AIS support for multiple links as described above, there are several architecture choices that may be used to provide local breakout. One architectural choice involves the use of multiple GRE keys. Another architectural choice involves the use of one GRE tunnel and multiple broadcast addresses.

FIGS. 17A and 17B illustrate an implementation that employs two GRE keys. Here, the access gateway ("AGW") 1608 may provide a GRE key (e.g., GRE0) to the eBS 1604, and binds the same to any PMIP tunnel with the local mobility agent ("LMA") 1624. The key GRE0 may imply the following: If GRE0 is an even number, it is mapped to the level 1 address, and GRE0+1 is mapped to the level 2 address of the same user; If GRE0 is an odd number, it is mapped to the level 2 address, and GRE0−1 is mapped to the level 1 address of the same user. The eBS 1604 and the access gateway 1608 are configured to accept packets based on any of these GRE keys. Various provisions may be made to provide the two keys at the eBS 1604. For example, both keys may be sent to the eBS 1604 or one key may be generated based on another key that is sent to the eBS 1604.

FIG. 17A illustrates sample uplink traffic flow. Here, the lines 1702 represent traffic flow that is tunneled between the eBS 1604 and the access gateway 1608 using a first GRE key (GRE0). For example, this traffic flow may relate to level 2 packets between the access terminal ("AT") 1602 and the local mobility agent 1624. Uplink packets may thus be destined for correspondent nodes elsewhere on the Internet. The lines 1704 represent traffic flow that is tunneled between the eBS 1604 and the access gateway 1608 using a second GRE key (GRE1). This traffic flow may thus relate to level 1 packets between the access terminal 1602 and the access gateway 1608 (e.g., carrying local breakout traffic supported by the access gateway 1608). The lines 1706 represent traffic flow that is not tunneled. For example, this traffic flow may relate to local breakout packets between the access terminal 1602 and local devices on the same subnetwork as the eBS 1604. FIG. 17B illustrates complementary traffic flow for a downlink.

At the eBS 1604, the level 1 and level 2 packets may be identified by the link level to which they belong (on the reverse link) and by the GRE key of their tunnel (on the forward link). The level 0 packets on the forward link are handled in different manner. For example, the eBS 1604 may look at the destination address to determine the access terminal to which the packet is destined.

Figure 18A:
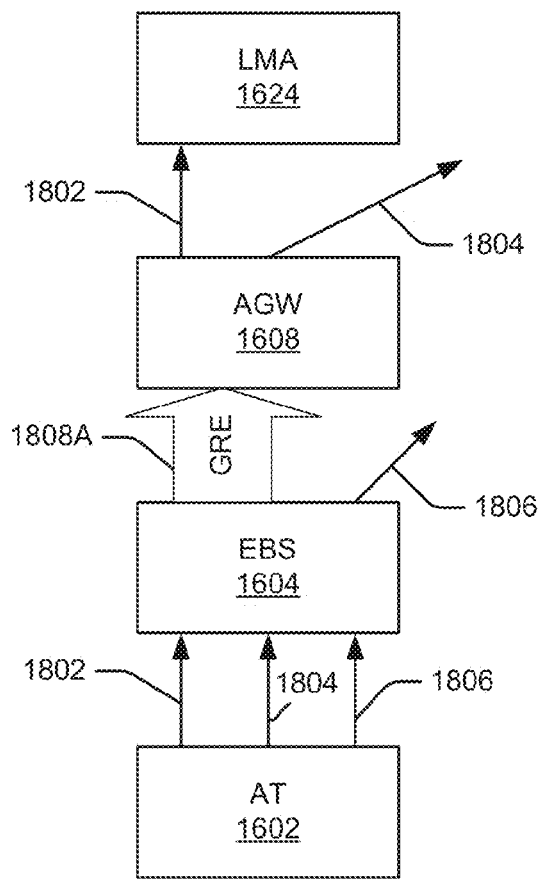
FIGS. 18A and 18B are simplified block diagrams of several sample aspects of a wireless communication system employing a single key to support multiple links for local breakout.
Figure 18B:
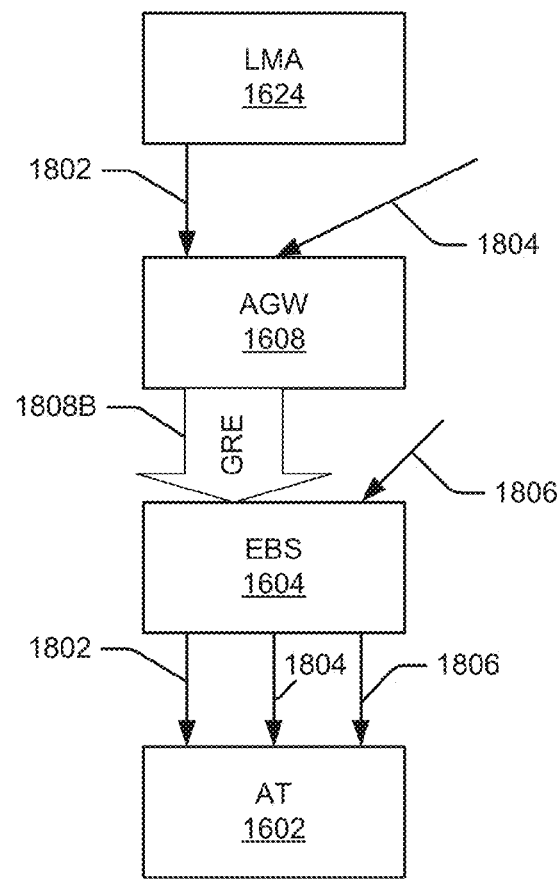

FIGS. 18A and 18B illustrate an implementation that employs one GRE key. Under this solution, the level 0 packets (lines 1806) are handled as above, however, there is a single GRE tunnel 1808 between the access gateway 1608 and the eBS 1604. As such, on the reverse link as represented by FIG. 18A, packets arriving within the GRE tunnel 1808A are demultiplexed at the access gateway 1608. Conversely, on the forward link as represented by FIG. 18B, packets arriving within the GRE tunnel 1808B are demultiplexed at the eBS 1604.

On the reverse link, the access gateway 1608 may demultiplex packets belonging to level 1 (lines 1804) and level 2 (lines 1802) by considering the source address of the packets, and determining the link level based on the subnet. Similarly, on the forward link, the eBS 1604 may look at the IP destination address of the packet to determine the link level to which the packet belongs, based on the subnet.

However, broadcast packets belonging to levels 1 and 2 may pose a problem since they are sent to the same IP address. To resolve this, broadcast packets for level 1 breakout protocols (e.g., RRP, RRQ, router solicitation and advertisements) may be sent to different addresses. DHCP packets may be demultiplexed using the client identifier option available in the protocol. Alternatively, the broadcast packets may be demultiplexed by looking inside the packet and using protocol-specific information.

As mentioned above, local breakout schemes as taught herein may be used in a mixed deployment that includes macro coverage (e.g., a large area cellular network such as a 3G network, typically referred to as a macro cell network or a Wide Area Network—WAN) and smaller coverage (e.g., a residence-based or building-based network environment, typically referred to as a Local Area Network—LAN). Here, as an access terminal ("AT") moves through such a network, the access terminal may be served in certain locations by access points that provide macro coverage while the access terminal may be served at other locations by access points that provide smaller area coverage. In some aspects, the smaller area coverage nodes may be used to provide incremental capacity growth, in-building coverage, and different services, all leading to a more robust user experience.

A node that provides coverage over a relatively large area may be referred to as a macro node while a node that provides coverage over a relatively small area (e.g., a residence) may be referred to as a femto node. It should be appreciated that the teachings herein may be applicable to nodes associated with other types of coverage areas. For example, a pico node may provide coverage over an area that is smaller than a macro area and larger than a femto area (e.g., coverage within a commercial building). In various applications, other terminology may be used to reference a macro node, a femto node, or other access point-type nodes. For example, a macro node may be configured or referred to as an access node, base station, access point, eNodeB, macro cell, and so on. Also, a femto node may be configured or referred to as a Home NodeB, Home eNodeB, access point base station, femto cell, and so on. In some implementations, a node may be associated with (e.g., divided into) one or more cells or sectors. A cell or sector associated with a macro node, a femto node, or a pico node may be referred to as a macro cell, a femto cell, or a pico cell, respectively. A simplified example of how femto nodes may be deployed in a network is provided in FIG. 19.

Figure 19:
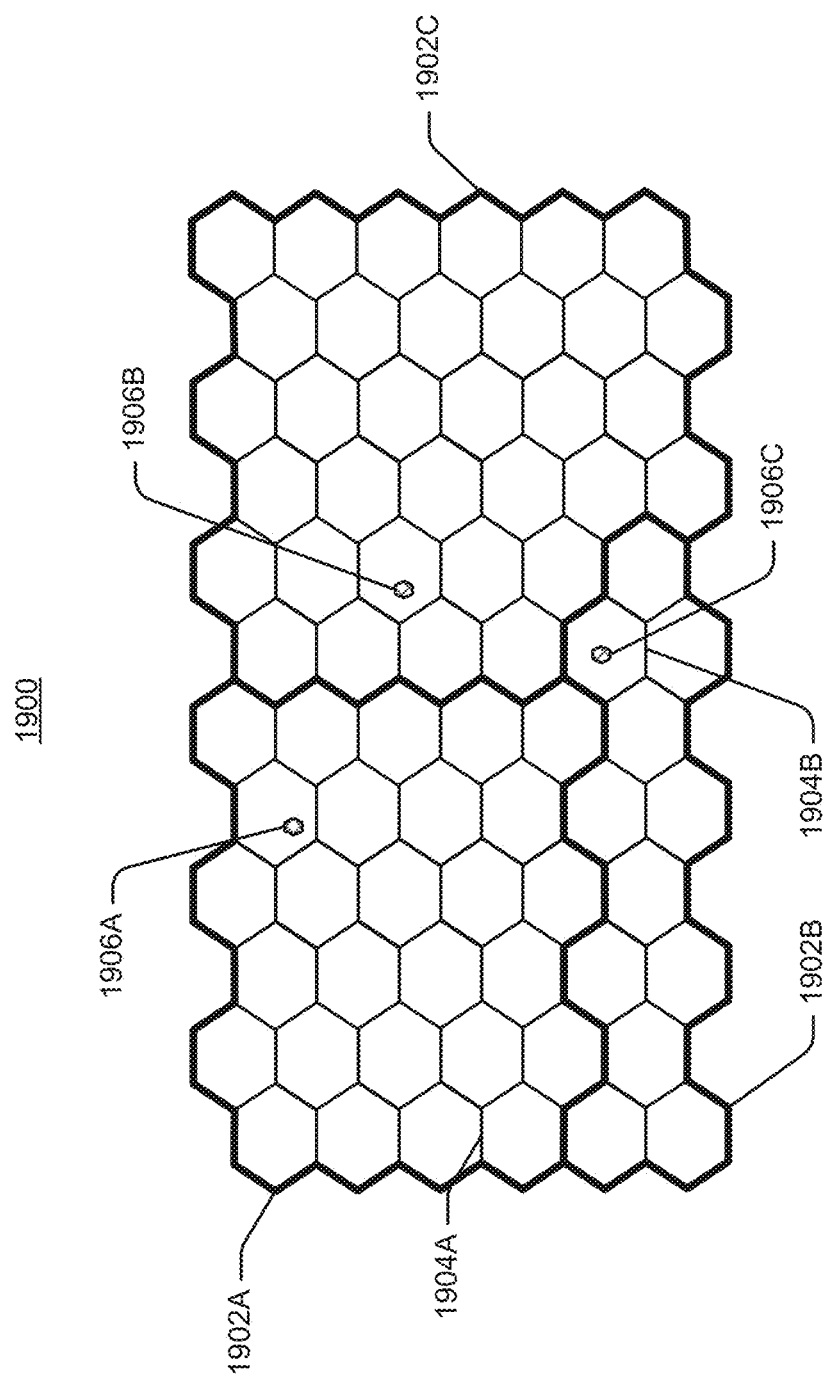
FIG. 19 is a simplified diagram illustrating coverage areas for wireless communication.

FIG. 19 illustrates an example of a coverage map 1900 where several tracking areas 1902 (or routing areas or location areas) are defined, each of which includes several macro coverage areas 1904. Here, areas of coverage associated with tracking areas 1902A, 1902B, and 1902C are delineated by the wide lines and the macro coverage areas 1904 are represented by the hexagons. The tracking areas 1902 also include femto coverage areas 1906. In this example, each of the femto coverage areas 1906 (e.g., femto coverage area 1906C) is depicted within a macro coverage area 1904 (e.g., macro coverage area 1904B). It should be appreciated, however, that a femto coverage area 1906 may lie partially within or outside of a macro coverage area 1904. Also, one or more pico coverage areas (not shown) may be defined within one or more tracking areas 1902 or macro coverage areas 1904. It should be appreciated that there could be multiple femto coverage areas within a macro coverage area, either within it or straddling across boundaries with adjacent macro cells.

Figure 20:
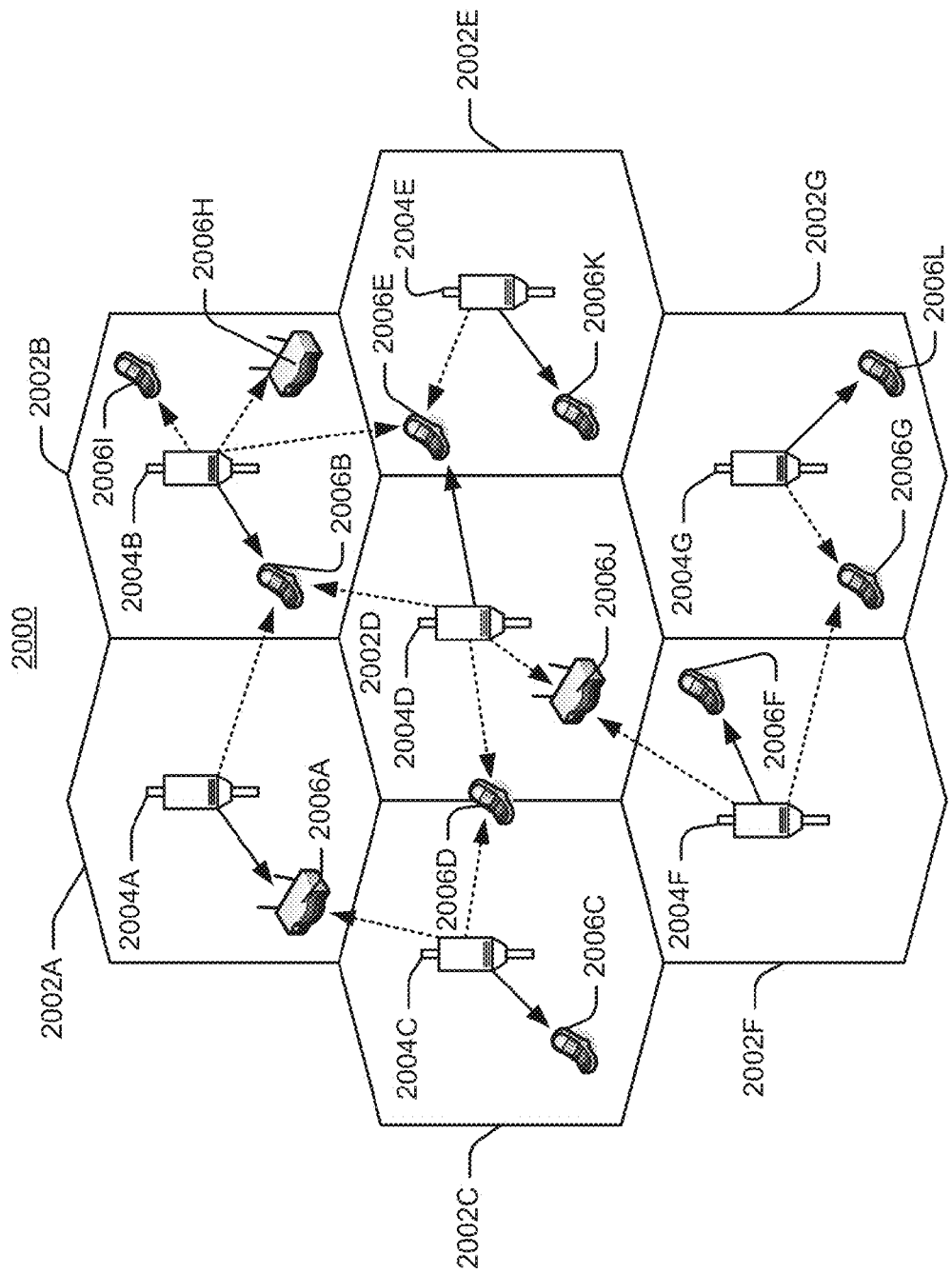
FIG. 20 is a simplified diagram of a wireless communication system.

FIG. 20 illustrates several aspects of a wireless communication system 2000 comprising multiple cells 2002, such as, for example, macro cells 2002A-2002G, with each cell being serviced by a corresponding access point 2004 (e.g., access points 2004A-2004G). Thus, the macro cells 2002 may correspond to the macro coverage areas 1904 of FIG. 19. As shown in FIG. 20, access terminals 2006 (e.g., access terminals 2006A-2006L) may be dispersed at various locations throughout the system over time. Each access terminal 2006 may communicate with one or more access points 2004 on a forward link ("FL") and/or a reverse link ("RL") at a given moment, depending upon whether the access terminal 2006 is active and whether it is in soft handoff, for example. The wireless communication system 2000 may provide service over a large geographic region. For example, macro cells 2002A-2002G may cover a few blocks in a neighborhood or several square miles in rural environment.

Figure 21:
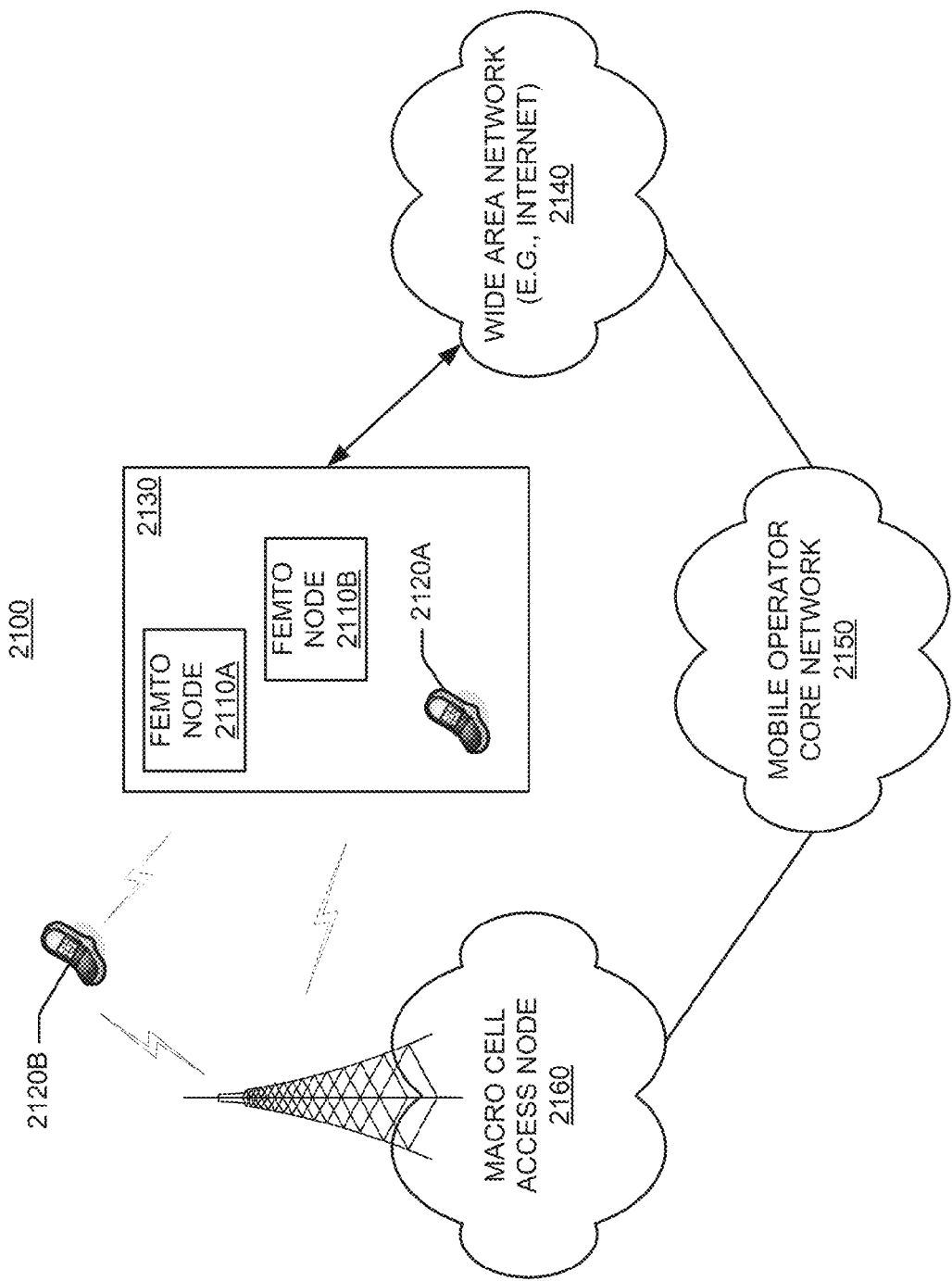
FIG. 21 is a simplified diagram of a wireless communication system including femto nodes.

FIG. 21 is an example of a system 2100 that illustrates how one or more femto nodes may be deployed within a network environment (e.g., the system 2000). The system 2100 includes multiple femto nodes 2110 (e.g., femto nodes 2110A and 2110B) installed in a relatively small area coverage network environment (e.g., in one or more user residences 2130). Each femto node 2110 may be coupled to a wide area network 2140 (e.g., the Internet) and a mobile operator core network 2150 via a DSL router, a cable modem, a wireless link, or other connectivity means (not shown).

The owner of a femto node 2110 may subscribe to mobile service, such as, for example, 3G mobile service, offered through the mobile operator core network 2150. In addition, an access terminal 2120 may be capable of operating both in macro environments and in smaller area coverage (e.g., residential) network environments. In other words, depending on the current location of the access terminal 2120, the access terminal 2120 may be served by a macro cell access point 2160 associated with the mobile operator core network 2150 or by any one of a set of femto nodes 2110 (e.g., the femto nodes 2110A and 2110B that reside within a corresponding user residence 2130). For example, when a subscriber is outside his home, he may be served by a standard macro access point (e.g., access point 2160) and when the subscriber is near or inside his home, he may be served by a femto node (e.g., node 2110A). Here, a femto node 2110 may be backward compatible with legacy access terminals 2120.

A node (e.g., a femto node) may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 2110 that reside within the corresponding user residence 2130). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access points (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association (e.g., the femto node allows access to any access terminal). A restricted femto node may refer to a femto node that is restricted in some manner (e.g., restricted for association and/or registration). A home femto node may refer to a femto node on which the access terminal is authorized to access and operate on (e.g., permanent access is provided for a defined set of one or more access terminals). A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node (e.g., the access terminal has permanent access to the femto node). A guest access terminal may refer to an access terminal with temporary access to the restricted femto node (e.g., limited based on deadline, time of use, bytes, connection count, or some other criterion or criteria). An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. Each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 22:
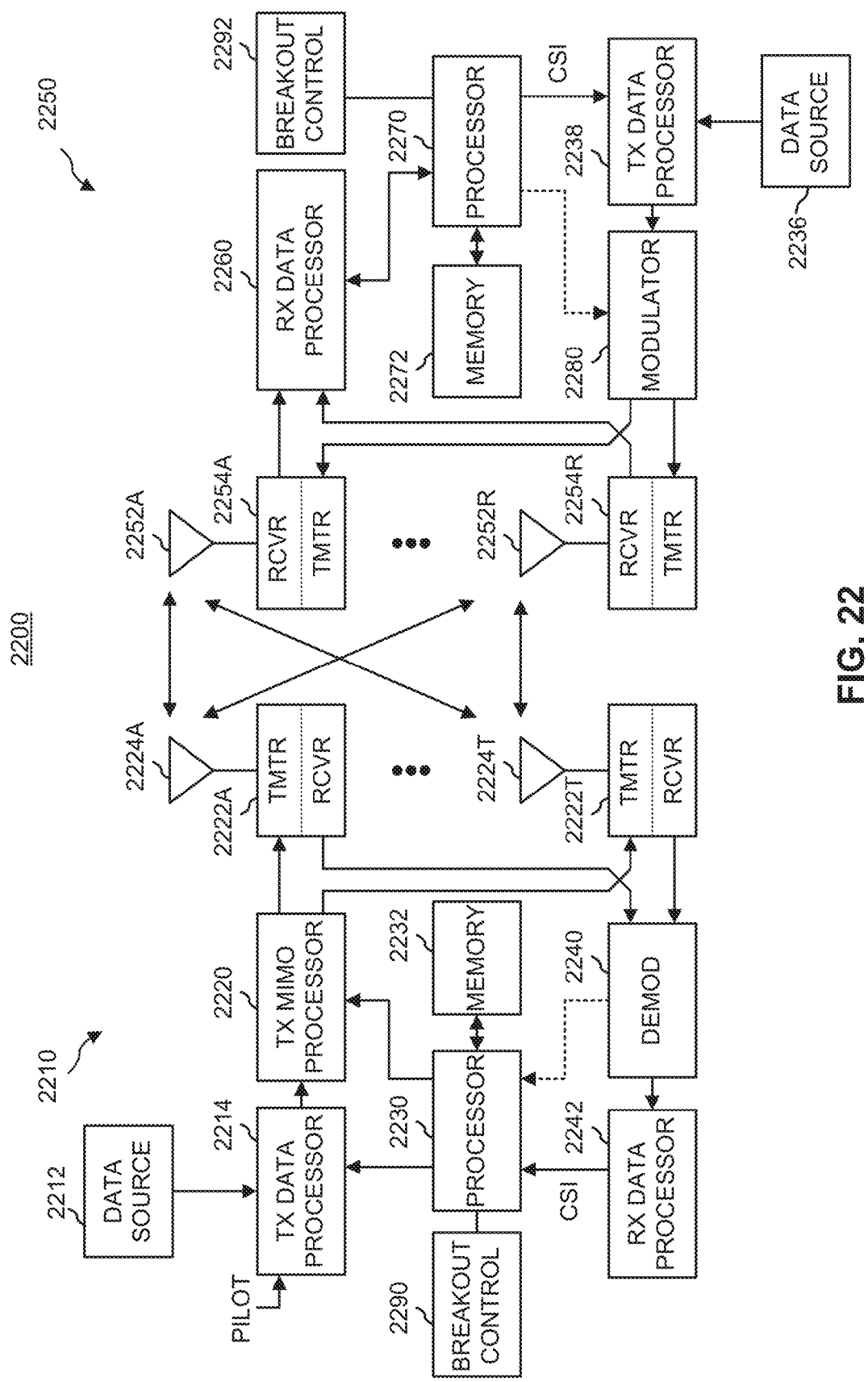
FIG. 22 is a simplified block diagram of several sample aspects of communication components.

The teachings herein may be incorporated into a node (e.g., a device) employing various components for communicating with at least one other node. FIG. 22 depicts several sample components that may be employed to facilitate communication between nodes. Specifically, FIG. 22 illustrates a wireless device 2210 (e.g., an access point) and a wireless device 2250 (e.g., an access terminal) of a MIMO system 2200. At the device 2210, traffic data for a number of data streams is provided from a data source 2212 to a transmit ("TX") data processor 2214.

In some aspects, each data stream is transmitted over a respective transmit antenna. The TX data processor 2214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 2230. A data memory 2232 may store program code, data, and other information used by the processor 2230 or other components of the device 2210.

The modulation symbols for all data streams are then provided to a TX MIMO processor 2220, which may further process the modulation symbols (e.g., for OFDM). The TX MIMO processor 2220 then provides $N_T$ modulation symbol streams to $N_T$ transceivers ("XCVR") 2222A through 2222T. In some aspects, the TX MIMO processor 2220 applies beam-forming weights to the symbols of the data streams and to the antenna from which the symbol is being transmitted.

Each transceiver 2222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 2222A through 2222T are then transmitted from $N_T$ antennas 2224A through 2224T, respectively.

At the device 2250, the transmitted modulated signals are received by $N_R$ antennas 2252A through 2252R and the received signal from each antenna 2252 is provided to a respective transceiver ("XCVR") 2254A through 2254R. Each transceiver 2254 conditions (e.g., filters, amplifies, and downconverts) a respective received signal, digitizes the conditioned signal to provide samples, and further processes the samples to provide a corresponding "received" symbol stream.

A receive ("RX") data processor 2260 then receives and processes the $N_R$ received symbol streams from $N_R$ transceivers 2254 based on a particular receiver processing technique to provide $N_T$ "detected" symbol streams. The RX data processor 2260 then demodulates, deinterleaves, and decodes each detected symbol stream to recover the traffic data for the data stream. The processing by the RX data processor 2260 is complementary to that performed by the TX MIMO processor 2220 and the TX data processor 2214 at the device 2210.

A processor 2270 periodically determines which precoding matrix to use (discussed below). The processor 2270 formulates a reverse link message comprising a matrix index portion and a rank value portion. A data memory 2272 may store program code, data, and other information used by the processor 2270 or other components of the device 2250.

The reverse link message may comprise various types of information regarding the communication link and/or the received data stream. The reverse link message is then processed by a TX data processor 2238, which also receives traffic data for a number of data streams from a data source 2236, modulated by a modulator 2280, conditioned by the transceivers 2254A through 2254R, and transmitted back to the device 2210.

At the device 2210, the modulated signals from the device 2250 are received by the antennas 2224, conditioned by the transceivers 2222, demodulated by a demodulator ("DEMOD") 2240, and processed by a RX data processor 2242 to extract the reverse link message transmitted by the device 2250. The processor 2230 then determines which pre-coding matrix to use for determining the beam-forming weights then processes the extracted message.

FIG. 22 also illustrates that the communication components may include one or more components that perform local breakout-related operations as taught herein. For example, a breakout control component 2290 may cooperate with the processor 2230 and/or other components of the device 2210 to send/receive signals to/from another device (e.g., device 2250) as taught herein. Similarly, a breakout control component 2292 may cooperate with the processor 2270 and/or other components of the device 2250 to send/receive signals to/from another device (e.g., device 2210). It should be appreciated that for each device 2210 and 2250 the functionality of two or more of the described components may be provided by a single component. For example, a single processing component may provide the functionality of the breakout control component 2290 and the processor 2230 and a single processing component may provide the functionality of the breakout control component 2292 and the processor 2270.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA"), cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Re199, Re15, Re16, Re17) technology, as well as 3GPP2 (1×RTT, 1×EV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), an eBS, a radio base station ("RBS"), a base station controller ("BSC"), a base transceiver station ("BTS"), a transceiver function ("TF"), a radio transceiver, a radio router, a basic service set ("BSS"), an extended service set ("ESS"), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 23:
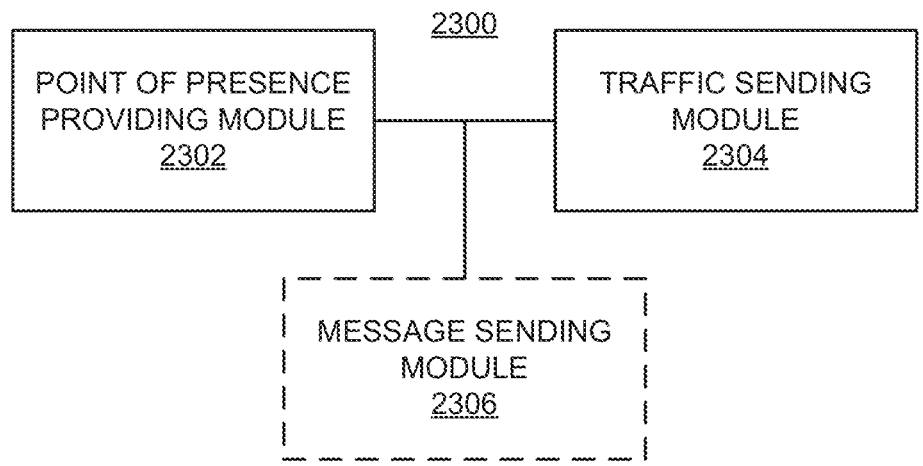
FIGS. 23-25 are simplified block diagrams of several sample aspects of apparatuses configured to facilitate local breakout as taught herein.
Figure 24:
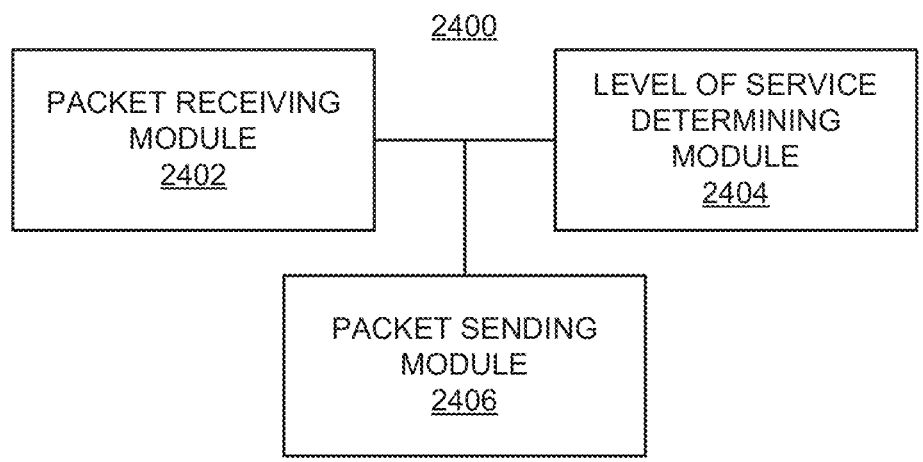
Figure 25:
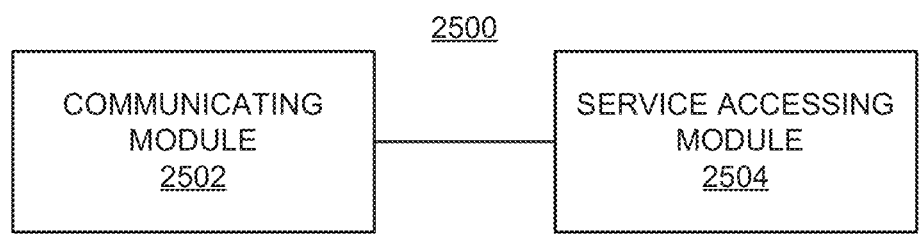

The functionality described herein (e.g., with regard to one or more of the accompanying figures) may correspond in some aspects to similarly designated "means for" functionality in the appended claims. Referring to FIGS. 23-25, apparatuses 2300, 2400, and 2500 are represented as a series of interrelated functional modules. Here, a point of presence providing module 2302 may correspond at least in some aspects to, for example, a point of presence controller as discussed herein. A traffic sending module 2304 may correspond at least in some aspects to, for example, a communication controller as discussed herein. A message sending module 2306 may correspond at least in some aspects to, for example, a communication controller as discussed herein. A packet receiving module 2402 may correspond at least in some aspects to, for example, a receiver as discussed herein. A level of service determining module 2404 may correspond at least in some aspects to, for example, a level of service determiner as discussed herein. A packet sending module 2406 may correspond at least in some aspects to, for example, a communication controller as discussed herein. A communicating module 2502 may correspond at least in some aspects to, for example, a control signal processor as discussed herein. A service accessing module 2504 may correspond at least in some aspects to, for example, a communication controller as discussed herein.

The functionality of the modules of FIGS. 23-25 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 23-25 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

In view of the above, in some aspects a first method of communication comprises: providing a first Internet protocol point of presence to enable an access terminal to access a local service; providing a second Internet protocol point of presence to enable the access terminal to access a network service; and sending traffic associated with the local service and traffic associated with the network service over a common air interface. In addition, in some aspects at least one of the following also may apply to the second method of communication: the first Internet protocol point of presence is associated with a first access point name or a first Internet protocol address, and the second Internet protocol point of presence is associated with a second access point name or a second Internet protocol address; the local service comprises service provided via an access point that communicates with the access terminal over the common air interface, and the network service comprises service provided via a first hop router for the access terminal; the access point is associated with an Internet protocol subnetwork, and the local service comprises service provided by an entity that is associated with the Internet protocol subnetwork; the local service comprises service provided via a gateway through which traffic from the access terminal flows to a first hop router for the access terminal, and the network service comprises service provided via the first hop router; the local service comprises Internet access provided by via an access point that communicates with the access terminal over the common air interface, and the Internet access is not provided via a first hop router for the access terminal; the method further comprises sending messages associated with a first protocol via a second protocol to manage the sending of the traffic associated with the local service; the first protocol is associated with communication between a mobility manager and a serving gateway, and the second protocol is associated with communication between the mobility manager and an access point.

In some aspects a second method of communication comprises: identifying an Internet protocol point of presence for an over-the-air packet to indicate a termination of a packet tunnel for the packet; and sending the packet based on the identified Internet protocol point of presence. In addition, in some aspects at least one of the following also may apply to the second method of communication: the identification of the Internet protocol point of presence comprises determining, at an access point, an identifier that is transmitted with the packet, and the sending of the packet comprises forwarding the packet via the tunnel to a node that is identified based on the identifier; the identifier is transmitted via a header that resides between an Internet Protocol header and a radio link protocol header of the packet; wherein the identification of the Internet protocol point of presence comprises: defining, at an access terminal, an identifier of the Internet protocol point of presence, and transmitting the identifier with the packet; the identifier is transmitted via a header that resides between an Internet Protocol header and a radio link protocol header of the packet; the identification of the Internet protocol point of presence comprises identifying, at an access point, a stream on which the packet is transmitted, and the sending of the packet comprises forwarding the packet via the tunnel to a node that is identified based on the stream; the stream is associated with a data radio bearer designated for local traffic; the identification of the Internet protocol point of presence comprises: determining, at an access terminal, a stream associated with the Internet protocol point of presence, and transmitting the packet via the determined stream; the stream is associated with a data radio bearer designated for local traffic; the identified Internet protocol point of presence indicates whether the over-the-air packet is associated with a local service or a network service; the identified Internet protocol point of presence indicates whether the over-the-air packet is associated with a home network or a visited network; the identified Internet protocol point of presence is representative of a relative depth within a network of a node associated with the termination.

In some aspects a third method of communication comprises: communicating with a first mobility manager at a local node via first control signaling; communicating with a second mobility manager at another node via second control signaling; and accessing a first service based on the communication with the first mobility manager and accessing a second service based on the communication with the second mobility manager. In addition, in some aspects at least one of the following also may apply to the first method of communication: the first control signaling is associated with a first non access stratum instance supported by an access terminal, and the second control signaling is associated with a second non access stratum instance supported by the access terminal; the first control signaling is associated with bearer management for the first service, and the second control signaling is associated with bearer management for the second service; the first control signaling is associated with paging management for the first service, and the second control signaling is associated with paging management for the second service; the first and second control signaling cause different types of paging for different types of traffic; the local node comprises an access point that communicates over-the-air with an access terminal that accesses the first service and the second service; the first service comprises local service provided via the access point, and the second service comprises network service provided via a first hop router for the access terminal; the first service comprises local service provided via a gateway through which traffic from the access terminal flows to a first hop router for the access terminal, and the second service comprises network service provided via the first hop router.

In some aspects, functionality corresponding to one or more of the above aspects relating to the first, second, and third methods of communication may be implemented, for example, in an apparatus using structure as taught herein. In addition, a computer-program product may comprise codes configured to cause a computer to provide functionality corresponding to one or more of the above aspects relating to the first, second, and third methods of communication.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
receiving at an access point a packet from an access terminal;
determining a level of service associated with the packet based on whether the packet is associated with a local service or a network service, wherein:
a first Internet protocol address is associated with the local service,
the access point is associated with an Internet protocol subnetwork, and
a second Internet protocol address is associated with the network service;
determining whether to send the packet via a protocol tunnel based on the determined level of service, wherein:
the packet is tunneled via a protocol tunnel that terminates in a core network gateway when the determined level of service indicates that the packet is associated with the network service, and
the packet is tunneled via a protocol tunnel that terminates in a home network when the determined level of service indicates that the packet is associated with the local service;
receiving at the access point a page request from a local mobility management entity relating to traffic associated with the local service, wherein paging is initiated only at the access point; and
paging the access terminal in response to receiving the page request.

2. The method of claim 1, wherein the level of service indicates whether packets are to be tunneled.

3. The method of claim 1, wherein the level of service is also associated with an access point name.

4. The method of claim 1, wherein the determination of the level of service comprises determining an identifier that is transmitted with the packet.

5. The method of claim 1, wherein the determination of the level of service comprises determining a stream on which the packet is transmitted.

6. The method of claim 5, wherein the stream is associated with a data radio bearer.

7. An apparatus for communication, comprising:
a receiver configured to receive at an access point a packet from an access terminal;
a level of service determiner configured to determine a level of service associated with the packet based on whether the packet is associated with a local service or a network service, wherein:
a first Internet protocol address is associated with the local service,
the access point is associated with an Internet protocol subnetwork, and
a second Internet protocol address is associated with the network service;
a communication controller configured to determine whether to send the packet via a protocol tunnel based on the determined level of service, wherein:
the packet is tunneled via a protocol tunnel that terminates in a core network gateway when the determined level of service indicates that the packet is associated with the network service, and
the packet is tunneled via a protocol tunnel that terminates in a home network when the determined level of service indicates that the packet is associated with the local service;
wherein the receiver is further configured to receive at the access point a page request from a local mobility management entity relating to traffic associated with the local service, wherein paging is initiated only at the access point; and
a transmitter configured to page the access terminal in response to the access point receiving the page request.

8. The apparatus of claim 7, wherein the level of service indicates whether packets are to be tunneled.

9. The apparatus of claim 7, wherein the level of service is also associated with an access point name.

10. The apparatus of claim 7, wherein the determination of the level of service comprises determining an identifier that is transmitted with the packet.

11. The apparatus of claim 7, wherein the determination of the level of service comprises determining a stream on which the packet is transmitted.

12. An apparatus for communication, comprising:
means for receiving at an access point a packet from an access terminal;
means for determining a level of service associated with the packet based on whether the packet is associated with a local service or a network service, wherein:
a first Internet protocol address is associated with the local service,
the access point is associated with an Internet protocol subnetwork, and
a second Internet protocol address is associated with the network service;
means for determining whether to send the packet via a protocol tunnel based on the determined level of service, wherein:
the packet is tunneled via a protocol tunnel that terminates in a core network gateway when the determined level of service indicates that the packet is associated with the network service, and
the packet is tunneled via a protocol tunnel that terminates in a home network when the determined level of service indicates that the packet is associated with the local service;
means for receiving at the access point a page request from a local mobility management entity relating to traffic associated with the local service, wherein paging is initiated only at the access point, and
means for paging the access terminal in response to receiving the page request.

13. The apparatus of claim 12, wherein the level of service indicates whether packets are to be tunneled.

14. The apparatus of claim 12, wherein the level of service is also associated with an access point name.

15. The apparatus of claim 12, wherein the determination of the level of service comprises determining an identifier that is transmitted with the packet.

16. The apparatus of claim 12, wherein the determination of the level of service comprises determining a stream on which the packet is transmitted.

17. A non-transitory computer-readable medium comprising code for causing a computer to:
receive at an access point a packet from an access terminal;

determine a level of service associated with the packet based at least in part on whether the packet is associated with a local service or a network service, wherein:
  a first Internet protocol address is associated with the local service,
  the access point is associated with an Internet protocol subnetwork, and
  a second Internet protocol address is associated with the network service;
determine whether to send the packet via a protocol tunnel based on the determined level of service, wherein:
  the packet is tunneled via a protocol tunnel that terminates in a core network gateway when the determined level of service indicates that the packet is associated with the network service, and
  the packet is tunneled via a protocol tunnel that terminates in a home network when the determined level of service indicates that the packet is associated with the local service;
receive at the access point a page request from a local mobility management entity relating to traffic associated with the local service, wherein paging is initiated only at the access point; and
page the access terminal in response to receiving the page request.

18. The non-transitory computer-readable medium of claim 17, wherein the level of service is also associated with an access point name.

19. A method of communication, comprising:
using, at an access terminal, a first non access stratum (NAS) instance to communicate with a first node via a common air interface with an access point;
using, at the access terminal, a second NAS instance to communicate with a second node via the common air interface with the access point;
accessing a first service based on the communication with the first node and accessing a second service based on the communication with the second node,
wherein the first node is associated with an Internet protocol subnetwork,
wherein the first service comprises local service and the second service comprises network service, and
wherein the communication with the first node is tunneled via a protocol tunnel that terminates in a home network and the communication with the second node is tunneled via a protocol tunnel that terminates in a core network gateway; and
receiving from the access point a paging message relating to traffic associated with the local service, wherein paging is initiated only at the access point.

20. The method of claim 19, wherein:
the first node provides, for the first service, at least one of the group consisting of: mobility management and session management; and
the second node provides, for the second service, at least one of the group consisting of: mobility management and session management.

21. The method of claim 19, wherein:
the first NAS instance is associated with bearer management for the first service; and
the second NAS instance is associated with bearer management for the second service.

22. The method of claim 19, wherein:
the first NAS instance is associated with paging management for the first service; and
the second NAS instance is associated with paging management for the second service.

23. The method of claim 19, wherein the first and second NAS instances provide different types of paging for different types of traffic.

24. The method of claim 19, wherein the first node comprises an access point that communicates over-the-air with the access terminal.

25. The method of claim 19, wherein packets are sent in a tunnel to a first hop router.

26. The method of claim 19, wherein:
the first service comprises local service provided via a gateway through which traffic from the access terminal flows to a first hop router for the access terminal; and
the second service comprises network service provided via the first hop router.

27. An apparatus for communication, comprising:
a control signal processor configured to use, at an access terminal, a first non access stratum (NAS) instance to communicate with a first node via a common air interface with an access point, and further configured to use, at the access terminal, a second NAS instance to communicate with a second node via the common air interface with the access point;
a communication controller configured to access a first service based on the communication with the first node, and further configured to access a second service based on the communication with the second node,
wherein the first node is associated with an Internet protocol subnetwork,
wherein the first service comprises local service and the second service comprises network service, and
wherein the communication with the first node is tunneled via a protocol tunnel that terminates in a home network and the communication with the second node is tunneled via a protocol tunnel that terminates in a core network gateway; and
a receiver configured to receive from the access point a paging message relating to traffic associated with the local service, wherein paging is initiated only at the access point.

28. The apparatus of claim 27, wherein:
the first node provides, for the first service, at least one of the group consisting of: mobility management and session management; and
the second node provides, for the second service, at least one of the group consisting of: mobility management and session management.

29. The apparatus of claim 27, wherein:
the first NAS instance is associated with bearer management for the first service; and
the second NAS instance is associated with bearer management for the second service.

30. The apparatus of claim 27, wherein:
the first NAS instance is associated with paging management for the first service; and
the second NAS instance is associated with paging management for the second service.

31. The apparatus of claim 27, wherein the first and second NAS instances provide different types of paging for different types of traffic.

32. The apparatus of claim 27, wherein the first node comprises an access point that communicates over-the-air with the access terminal.

33. The apparatus of claim 27, wherein packets are sent in a tunnel to a first hop router.

34. The apparatus of claim 27, wherein:
the first service comprises local service provided via a gateway through which traffic from the access terminal flows to a first hop router for the access terminal; and
the second service comprises network service provided via the first hop router.

35. An apparatus for communication, comprising:
means for using, at an access terminal, a first non access stratum (NAS) instance to communicate with a first node via a common air interface with an access point, and for using, at the access terminal, a second NAS instance to communicate with a second node via the common air interface with the access point;
means for accessing a first service based on the communication with the first node, and for accessing a second service based on the communication with the second node,
wherein the first node is associated with an Internet protocol subnetwork,
wherein the first service comprises local service and the second service comprises network service, and
wherein the communication with the first node is tunneled via a protocol tunnel that terminates in a home network and the communication with the second node is tunneled via a protocol tunnel that terminates in a core network gateway; and
means for receiving from the access point a paging message relating to traffic associated with the local service, wherein paging is initiated only at the access point.

36. The apparatus of claim 35, wherein:
the first node provides, for the first service, at least one of the group consisting of: mobility management and session management; and
the second node provides, for the second service, at least one of the group consisting of: mobility management and session management.

37. The apparatus of claim 35, wherein:
the first NAS instance is associated with bearer management for the first service; and
the second NAS instance is associated with bearer management for the second service.

38. The apparatus of claim 35, wherein:
the first NAS instance is associated with paging management for the first service; and
the second NAS instance is associated with paging management for the second service.

39. The apparatus of claim 35, wherein the first and second NAS instances provide different types of paging for different types of traffic.

40. The apparatus of claim 35, wherein the first node comprises an access point that communicates over-the-air with the access terminal.

41. The apparatus of claim 35, wherein packets are sent in a tunnel to a first hop router.

42. The apparatus of claim 35, wherein:
the first service comprises local service provided via a gateway through which traffic from the access terminal flows to a first hop router for the access terminal; and
the second service comprises network service provided via the first hop router.

43. A non-transitory computer-readable medium comprising code for causing a computer to:
use, at an access terminal, a first non access stratum (NAS) instance to communicate with a first node via a common air interface with an access point;
use, at the access terminal, a second NAS instance to communicate with a second node via the common air interface with the access point;
access a first service based on the communication with the first node and access a second service based on the communication with the second node,
wherein the first node is associated with an Internet protocol subnetwork,
wherein the first service comprises local service and the second service comprises network service, and
wherein the communication with the first node is tunneled via a protocol tunnel that terminates in a home network and the communication with the second node is tunneled via a protocol tunnel that terminates in a core network gateway; and
receive from the access point a paging message relating to traffic associated with the local service, wherein paging is initiated only at the access point.

44. The non-transitory computer-readable medium of claim 43, wherein:
the first node provides, for the first service, at least one of the group consisting of: mobility management and session management; and
the second node provides, for the second service, at least one of the group consisting of: mobility management and session management.

45. The non-transitory computer-readable medium of claim 43, wherein:
the first NAS instance is associated with bearer management for the first service; and
the second NAS instance is associated with bearer management for the second service.

46. The non-transitory computer-readable medium of claim 43, wherein:
the first NAS instance is associated with paging management for the first service; and
the second NAS instance is associated with paging management for the second service.

47. The non-transitory computer-readable medium of claim 43, wherein the first and second NAS instances provide different types of paging for different types of traffic.

48. The non-transitory computer-readable medium of claim 43, wherein the first node comprises an access point that communicates over-the-air with the access terminal.

49. The non-transitory computer-readable medium of claim 43, wherein packets are sent in a tunnel to a first hop router.

50. The non-transitory computer-readable medium of claim 43, wherein:
the first service comprises local service provided via a gateway through which traffic from the access terminal flows to a first hop router for the access terminal; and
the second service comprises network service provided via the first hop router.

* * * * *